United States Patent
Okamura et al.

(10) Patent No.: US 9,824,782 B2
(45) Date of Patent: Nov. 21, 2017

(54) PHOTOCATALYST INJECTION METHOD AND PHOTOCATALYST INJECTION SYSTEM

(71) Applicant: KABUSHIKI KAISHA TOSHIBA, Minato-Ku (JP)

(72) Inventors: Masato Okamura, Yokohama (JP); Osamu Shibasaki, Yokohama (JP); Koji Negishi, Yokohama (JP); Seiji Yamamoto, Setagaya (JP); Hiroyuki Arai, Kamakura (JP); Yutaka Uruma, Kawasaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 329 days.

(21) Appl. No.: 14/432,547

(22) PCT Filed: Oct. 1, 2013

(86) PCT No.: PCT/JP2013/076714
§ 371 (c)(1),
(2) Date: Mar. 31, 2015

(87) PCT Pub. No.: WO2014/054643
PCT Pub. Date: Apr. 10, 2014

(65) Prior Publication Data
US 2015/0243387 A1   Aug. 27, 2015

(30) Foreign Application Priority Data
Oct. 3, 2012   (JP) ................. 2012-221576

(51) Int. Cl.
*G21C 19/307*   (2006.01)
*G21D 1/00*   (2006.01)
(Continued)

(52) U.S. Cl.
CPC .......... *G21C 19/307* (2013.01); *B01J 19/123* (2013.01); *B01J 23/40* (2013.01); *B01J 23/60* (2013.01);
(Continued)

(58) Field of Classification Search
CPC ...... G21C 19/28; G21C 19/30; G21C 19/307; G21C 15/28; G21C 17/022;
(Continued)

(56) References Cited

U.S. PATENT DOCUMENTS 5,602,888 A * 2/1997 Hettiarachchi ........ B01J 37/031
376/305
6,487,265 B1 * 11/2002 Nakamura ......... G21C 17/0225
376/305
(Continued)

FOREIGN PATENT DOCUMENTS

JP   2000 329895   11/2000
JP   2001 276628   10/2001

OTHER PUBLICATIONS

International Search Report dated Dec. 17, 2013 in PCT/JP2013/076714 Filed Oct. 1, 2013.
(Continued)

*Primary Examiner* — Sharon M Davis
(74) *Attorney, Agent, or Firm* — Oblon, McClelland, Maier & Neustadt, L.L.P.

(57) ABSTRACT

A photocatalyst injection system including: a reactor primary system coolant collection section collecting a reactor primary system coolant containing a noble metal or noble metal ion from a reactor primary system; a photocatalyst addition section adding a photocatalyst to the collected reactor primary system coolant; an ultraviolet irradiation section irradiating, with ultraviolet rays, the coolant to which the photocatalyst has been added for producing, in the
(Continued)

coolant, a noble metal-carrying photocatalyst in which the noble metal is carried on a surface of the photocatalyst; and a noble metal-carrying photocatalyst injection section injecting the coolant containing the noble metal-carrying photocatalyst into the reactor primary system.

16 Claims, 12 Drawing Sheets

(51) Int. Cl.

| | | |
|---|---|---|
| B01J 35/00 | (2006.01) | |
| G21C 17/022 | (2006.01) | |
| B01J 37/34 | (2006.01) | |
| B01J 23/40 | (2006.01) | |
| B01J 23/60 | (2006.01) | |
| B01J 23/89 | (2006.01) | |
| B01J 19/12 | (2006.01) | |
| C23F 11/18 | (2006.01) | |
| G21C 15/28 | (2006.01) | |
| G21C 19/28 | (2006.01) | |
| G21C 19/40 | (2006.01) | |
| B01J 37/02 | (2006.01) | |

(52) U.S. Cl.
CPC ......... *B01J 23/8906* (2013.01); *B01J 35/004* (2013.01); *B01J 37/345* (2013.01); *C23F 11/18* (2013.01); *G21C 15/28* (2013.01); *G21C 17/0225* (2013.01); *G21C 19/28* (2013.01); *G21C 19/40* (2013.01); *G21D 1/00* (2013.01); *B01J 37/0225* (2013.01); *B01J 2219/0869* (2013.01); *B01J 2219/0877* (2013.01); *B01J 2219/1203* (2013.01); *G21Y 2002/103* (2013.01); *G21Y 2004/10* (2013.01); *Y02E 30/40* (2013.01)

(58) Field of Classification Search
CPC ...... G21C 17/0225; C23F 11/08; C23F 11/18; C23F 11/185; C23F 15/00; B01J 23/38; B01J 23/8906; B01J 35/004
See application file for complete search history.

(56) References Cited

U.S. PATENT DOCUMENTS

| | | | | |
|---|---|---|---|---|
| 6,724,854 | B1* | 4/2004 | Kim | ................. G21C 19/307 376/306 |
| 6,940,939 | B1* | 9/2005 | Ichikawa | ............. G21C 17/022 376/301 |
| 2010/0323883 | A1* | 12/2010 | Hettiarachchi | .......... B01J 23/60 502/329 |

OTHER PUBLICATIONS

English translation of the International Preliminary Report on Patentability and Written Opinion dated Apr. 7, 2015 in PCT/JP2013/076714.

* cited by examiner

PHOTOCATALYST INJECTION METHOD AND PHOTOCATALYST INJECTION SYSTEM

TECHNICAL FIELD

The present invention relates to a photocatalyst injection method and a photocatalyst injection system by which corrosion of a metal member in contact with a coolant of a high temperature in a nuclear power plant is suppressed.

BACKGROUND ART

In a boiling-water reactor (BWR) nuclear power plant, oxygen, hydrogen peroxide and the like generated through water radiolysis occurring in a radiation field are present in a coolant of a reactor primary system (a reactor primary system coolant).

On the other hand, it is known that stress corrosion cracking is caused, in the presence of oxygen or hydrogen peroxide, in a stainless steel or a nickel base metal used as a construction material of a nuclear power plant under such a high-temperature environment as to be in contact with a reactor primary system coolant having a high temperature of approximately 280° C. As a countermeasure for suppressing the corrosion of such a metal member, a conventional nuclear power plant practices a hydrogen injection technology in which hydrogen is injected from a feed-water system for lowering the concentration of the oxygen or hydrogen peroxide in the reactor primary system coolant. The effect of lowering the concentration of the oxygen or hydrogen peroxide is exhibited as lowering of a corrosion potential of the metal member in contact with the reactor primary system coolant.

As another method for suppressing the corrosion of a metal member in contact with a reactor primary system coolant in a nuclear power plant, a photocatalyst anticorrosion technology for forming a film composed of a photocatalyst on the surface of a metal member is known as described in Patent Document 1 and Patent Document 2. In this technology, the photocatalyst depositing to the surface of the metal member is irradiated with light of an ultraviolet region for lowering a corrosion potential of the metal member, to which the photocatalyst deposits, by an action of an electron activated through a photo-excitation reaction of the photocatalyst.

Incidentally, this photo-excitation reaction efficiently proceeds when a noble metal is present in the vicinity of the photocatalyst. Therefore, if a photocatalyst or a high-functional photocatalyst obtained by depositing a noble metal to the surface of a photocatalyst is precedently deposited onto the surface of a metal member and a photo-excitation reaction is caused by irradiating such a photocatalyst with Cherenkov light, that is, light generated in a reactor core and including light of an ultraviolet region, the corrosion potential of the metal member can be lowered during an operation of the nuclear power plant.

As still another method for suppressing the corrosion of a metal member in contact with a reactor primary system coolant in a nuclear power plant, a technology to inject a noble metal into the reactor primary system coolant is known as described in Patent Document 3. In this noble metal injection technology, a noble metal is periodically injected from a feed-water system during an operation of a nuclear power plant, so as to allow the noble metal to be incorporated into an oxide film formed on the surface of a metal member, and thus, the corrosion potential of the metal member is lowered.

In the noble metal injection technology, however, it is necessary to also inject hydrogen so that a hydrogen/oxygen molar ratio in the reactor primary system coolant can be 2 or more. This is because the corrosion potential of a metal member is difficult to lower by the noble metal injection technology if the hydrogen/oxygen molar ratio in the reactor primary system coolant is lower than 2. Besides, if the noble metal injection technology is employed, the corrosion potential of the metal member is little lowered in an upper portion of a reactor, and hence, it is difficult to exhibit the anticorrosion effect in a metal member disposed in the upper portion of the reactor. In this manner, in the noble metal injection technology, an operation for controlling the hydrogen/oxygen molar ratio in the reactor primary system coolant is complicated as well as the anticorrosion effect for a metal member disposed in an upper portion of the reactor is small.

On the contrary, in the photocatalyst anticorrosion technology, even if the hydrogen/oxygen ratio in the reactor primary system coolant is lower than 2 or there is an excessive amount of hydrogen peroxide in the reactor primary system coolant, the anticorrosion effect for a metal member can be exhibited by lowering the corrosion potential of the metal member through irradiation with the light of the ultraviolet region.

Besides, even in a portion such as an upper portion of the reactor in which the anticorrosion effect is difficult to exhibit by employing the noble metal injection technology, the corrosion potential of the metal member can be lowered by the photocatalyst anticorrosion technology.

Accordingly, as a method for suppressing the corrosion of a metal member in contact with a reactor primary system coolant of a high temperature in a nuclear power plant, the photocatalyst anticorrosion technology is preferably employed, and in particular, the photocatalyst anticorrosion technology using a high-functional photocatalyst obtained by depositing a noble metal to the surface of a photocatalyst is more preferably employed.

PRIOR ART DOCUMENTS

Patent Documents

Patent Document 1: Japanese Patent Laid-Open No. 2003-139891
Patent Document 2: Japanese Patent Laid-Open No. 2001-004789
Patent Document 3: Japanese Patent Laid-Open No. 2000-509149

SUMMARY OF THE INVENTION

Problems to be Solved by the Invention

Even if any of the noble metal injection technology and the photocatalyst anticorrosion technology is employed, however, the noble metal is generally peeled off, as time passes, from the oxide film formed on the surface of the metal member or the surface of the photocatalyst, and hence, the anticorrosion effect for the metal member is unavoidably reduced.

The noble metal thus peeled off from the oxide film or the photocatalyst once may deposit again, but the amount of the noble metal is reduced through the peeling, and therefore, the anticorrosion effect for the metal member is reduced although some effect may be attained by the photocatalyst alone. Accordingly, in order to recover the anticorrosion effect for the metal member, it is necessary to practice again the noble metal injection technology or the photocatalyst anticorrosion technology using a high-functional photocatalyst.

Specifically, it is necessary to inject a noble metal into the reactor primary system coolant or inject a high-functional photocatalyst newly produced by using a photocatalyst and a noble metal into the reactor primary system coolant.

In this manner, in the noble metal injection technology and the photocatalyst anticorrosion technology described as the background art, there is a problem of high operating cost because it is thus necessary to periodically inject a noble metal or a high-functional photocatalyst containing a noble metal into a reactor primary system coolant.

The present invention was accomplished for overcoming this problem, and an object of the present invention is to provide a photocatalyst injection method and a photocatalyst injection system in which a high-functional photocatalyst is produced through reuse of a noble metal or noble metal ion present in a reactor primary system coolant so that an anticorrosion effect for a metal member can be increased even in a portion such as an upper portion of a reactor, where the anticorrosion effect is difficult to exhibit by the noble metal injection technology, and that an operating cost can be made small.

Means for Solving the Problems

The photocatalyst injection method of the present invention, which is to be employed for solving the above-described problem, comprises a reactor primary system coolant collecting step of collecting a reactor primary system coolant containing a noble metal or noble metal ion from a reactor primary system; a photocatalyst adding step of adding a photocatalyst to the collected reactor primary system coolant; an ultraviolet irradiating step of irradiating the coolant resulting from the photocatalyst adding step with ultraviolet rays for producing, in the coolant, a noble metal-carrying photocatalyst in which the noble metal is carried on a surface of the photocatalyst; and a noble metal-carrying photocatalyst injecting step of injecting the coolant resulting from the ultraviolet irradiating step into the reactor primary system.

Besides, the photocatalyst injection system of the present invention, which is to be employed for solving the above-described problem, comprising a reactor primary system coolant collection section collecting a reactor primary system coolant containing a noble metal or noble metal ion from a reactor primary system; a photocatalyst addition section adding a photocatalyst to the collected reactor primary system coolant; an ultraviolet irradiation section irradiating, with ultraviolet rays, the coolant to which the photocatalyst has been added for producing, in the coolant, a noble metal-carrying photocatalyst in which the noble metal is carried on a surface of the photocatalyst; and a noble metal-carrying photocatalyst injection section injecting the coolant containing the noble metal-carrying photocatalyst into the reactor primary system.

Advantages of the Invention

According to the photocatalyst injection method and the photocatalyst injection system of the present invention, a high-functional photocatalyst is produced by reusing a noble metal or a noble metal ion present in a reactor primary system coolant, and hence, an anticorrosion effect for a metal member is high even in a portion such as an upper portion of a reactor where the anticorrosion effect is difficult to exhibit by the noble metal injection technology, and an operating cost is low.

DESCRIPTION OF EMBODIMENTS

Photocatalyst Injection System

Now, a photocatalyst injection system of the present invention will be described with reference to the accompanying drawings.

Figure 1:
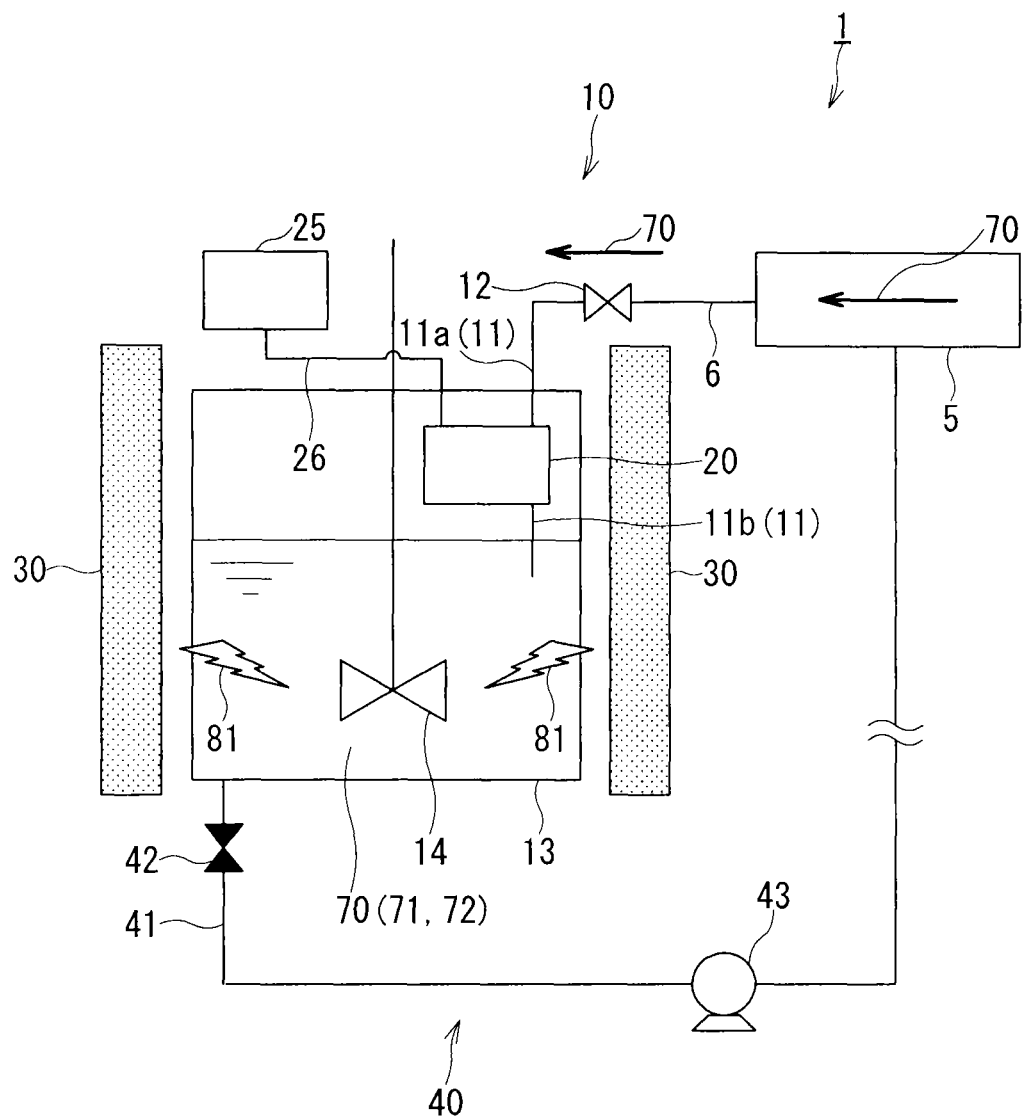
FIG. 1 is a schematic diagram of a photocatalyst injection system of the present invention.

FIG. 1 is a schematic diagram of the photocatalyst injection system of the present invention. This photocatalyst injection system 1 includes: a reactor primary system coolant collection section 10 for collecting a reactor primary system coolant 70 containing a noble metal or a noble metal ion from a reactor primary system 5; a photocatalyst addition section 20 for adding a photocatalyst to the collected reactor primary system coolant 70; an ultraviolet irradiation section 30 for producing, in water, a noble metal-carrying photocatalyst containing a noble metal carried on the surface of a photocatalyst by irradiating, with ultraviolet rays 81, a coolant (a first mixed solution) 71 obtained by the photocatalyst addition section 20; and a noble metal-carrying photocatalyst injection section 40 for injecting, into the reactor primary system 5, a coolant (a second mixed solution) 72 containing the noble metal-carrying photocatalyst.

Here, the reactor primary system 5 means one system, out of various systems included in a boiling-water reactor (BWR) nuclear power plant, through which a coolant containing a radioactive substance passes. Examples of the reactor primary system 5 include a main steam system, a feed-water system, a primary loop recirculation system, a residual heat removal system (an RHR system) and a reactor water cleanup system.

Examples of a metal member constituting the reactor primary system 5 include a main steam piping of the main steam system, a feed-water piping of the feed-water system, a recirculation piping of the primary loop recirculation system, a water cleanup piping of the reactor water cleanup system, a residual heat removal piping of the residual heat removal system, and a bottom drain piping. The material of the metal member constituting the reactor primary system 5 is, for example, a stainless steel, a nickel base metal or the like.

As illustrated in FIG. 1, the reactor primary system coolant 70 passes through the reactor primary system 5. The reactor primary system coolant 70 generally has different temperatures in different positions within the reactor primary system 5.

The photocatalyst injection system 1 further includes an ultraviolet irradiation tank 13, as a tank for holding a coolant such as the collected reactor primary system coolant 70, the first mixed solution 71 or the second mixed solution 72.

Here, the first mixed solution 71 means a liquid coolant that is prepared by mixing the collected reactor primary system coolant 70 and a photocatalyst and contains the photocatalyst and a noble metal or a noble metal ion. The first mixed solution 71 is produced into the second mixed solution 72 containing a noble metal-carrying photocatalyst through irradiation with ultraviolet rays. In other words, the first mixed solution 71 is a raw material of the second mixed solution 72.

Besides, the second mixed solution 72 means a liquid coolant containing a noble metal-carrying photocatalyst that is produced by irradiating the first mixed solution 71 with ultraviolet rays.

The first mixed solution 71 and the second mixed solution 72 will be described later.

The ultraviolet irradiation tank 13 is configured so that the coolant such as the first mixed solution 71 held in the ultraviolet irradiation tank 13 can be irradiated with the ultraviolet rays 81 emitted from the ultraviolet irradiation section 30 provided outside the ultraviolet irradiation tank 13.

In the ultraviolet irradiation tank 13, a stirrer 14 for stirring the coolant such as the first mixed solution 71 present in the ultraviolet irradiation tank 13 and containing the collected reactor primary system coolant 70 and the photocatalyst is provided.

The photocatalyst injection system 1 is a system by which corrosion of a metal member constituting the reactor primary system 5 is suppressed by injecting into the reactor primary system 5, namely, restoring to the reactor primary system 5, the second mixed solution 72 that is prepared by using the reactor primary system coolant 70 collected from the reactor primary system 5 and contains the noble metal-carrying photocatalyst having an anticorrosion function for the metal member.

<Reactor Primary System Coolant>

The reactor primary system coolant 70 present in the reactor primary system 5 contains a noble metal or noble metal ion 62.

Examples of the noble metal or noble metal ion 62 contained in the reactor primary system coolant 70 include one or more metals selected from Pt, Pd, Rh, Ru, Os and Ir, and ions thereof.

The noble metal or noble metal ion 62 contained in the reactor primary system coolant 70 present in the reactor primary system 5 generally includes, for example, a noble metal that has been injected into the reactor primary system coolant 70 for purpose of anticorrosion of a metal member constituting the reactor primary system 5 to be incorporated into an oxide film formed on the surface of the metal member and has been peeled off, and a noble metal that has been peeled off from a noble metal-carrying photocatalyst having been injected into the reactor primary system coolant 70 for the anticorrosion of a metal member constituting the reactor primary system 5. Here, a noble metal-carrying photocatalyst refers to a particulate complex in which a noble metal is carried on the surface of a photocatalyst particle.

The water quality of the reactor primary system coolant 70 present in the reactor primary system 5 may be either normal water quality with no hydrogen injected into the reactor primary system coolant 70 or hydrogen-injected water quality with hydrogen injected into the reactor primary system coolant 70.

For injecting hydrogen into the reactor primary system coolant 70, for example, a method of directly injecting hydrogen into the reactor primary system coolant 70 passing through a feed-water system not shown, or a method of injecting an alcohol such as methanol into the reactor primary system coolant 70 can be employed.

If the hydrogen-injected water quality is employed for the reactor primary system coolant 70, hydrogen is injected into the reactor primary system coolant 70 so that the hydrogen can be contained, for example, in an amount of generally 0.01 to 0.5 ppm, and preferably 0.2 to 0.4 ppm on a mass basis.

The reactor primary system coolant 70 preferably contains hydrogen in an amount of generally 0.01 to 0.5 ppm on a mass basis because if a noble metal-carrying photocatalyst 65 is deposited to the surface of a metal member constituting the reactor primary system 5, the corrosion potential of the metal member is largely lowered, and an anticorrosion effect for the metal member is highly exhibited in this case.

(Reactor Primary System Coolant Collection Section)

Figure 2:
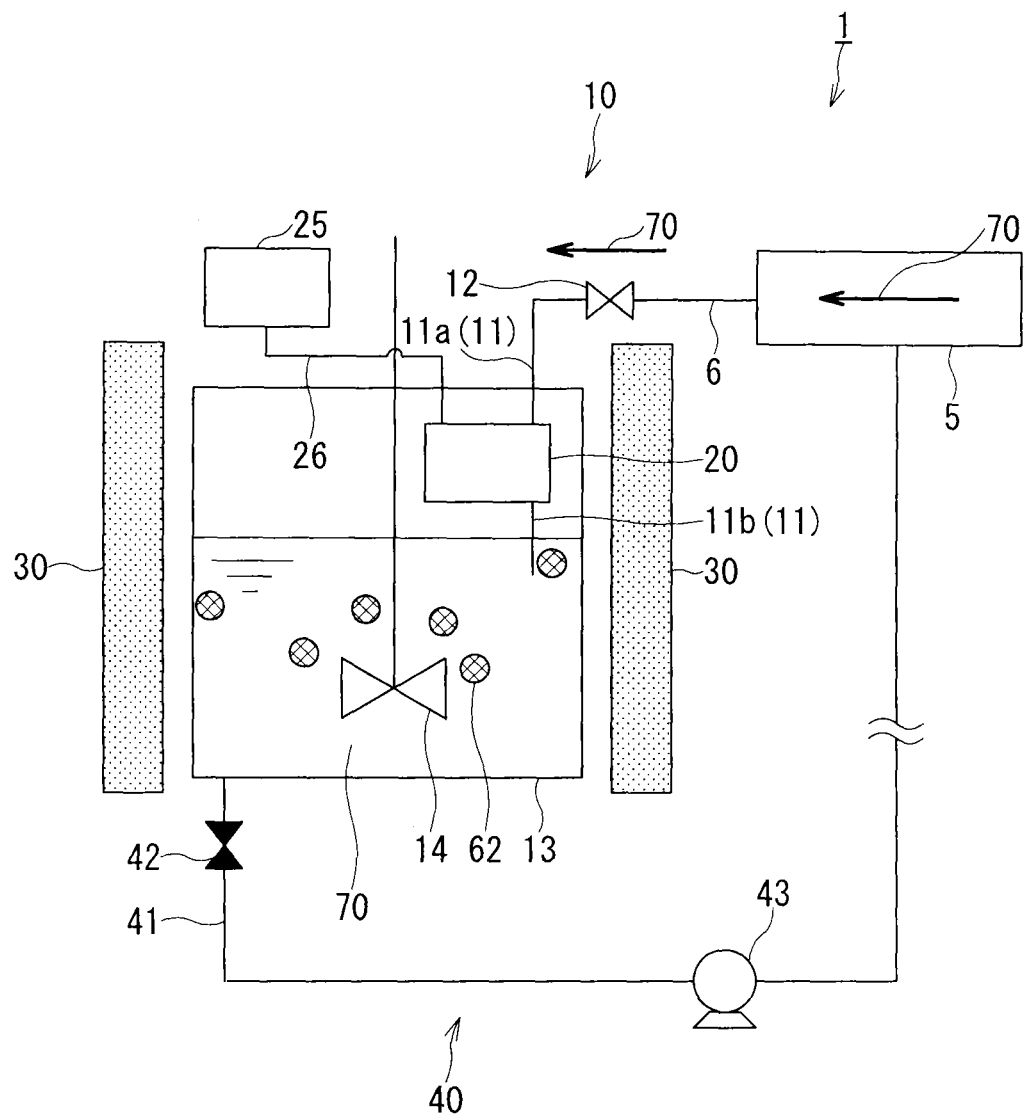
FIG. 2 is a schematic diagram explaining the configuration and the operation of the photocatalyst injection system of the present invention.

FIG. 2 is a schematic diagram explaining the configuration and the operation of the photocatalyst injection system of the present invention. FIG. 2 is a diagram illustrating a case where a coolant held in the ultraviolet irradiation tank 13 is the reactor primary system coolant 70 collected from the reactor primary system 5 in the photocatalyst injection system 1 of FIG. 1.

As illustrated in FIG. 2, the reactor primary system coolant collection section 10 corresponds to a section for collecting, from the reactor primary system 5, the reactor primary system coolant 70 containing the noble metal or noble metal ion 62.

Specifically, the reactor primary system coolant collection section 10 includes: a reactor primary system coolant collection piping 11 (11a and 11b) for feeding, to the ultraviolet irradiation tank 13, the reactor primary system coolant 70 collected from the reactor primary system 5; a valve 12 for controlling a flow rate of the reactor primary system coolant 70 passing through the reactor primary system coolant collection piping 11; the ultraviolet irradiation tank 13 for holding the collected reactor primary system coolant 70 fed through the reactor primary system coolant collection piping 11; and the stirrer 14, provided in the ultraviolet irradiation tank 13, for stirring the coolant such as the collected reactor primary system coolant 70.

(Photocatalyst Addition Section)

In the middle of the reactor primary system coolant collection piping 11, the photocatalyst addition section 20 for adding a photocatalyst to the collected reactor primary system coolant 70 is provided. Specifically, the reactor primary system coolant collection piping 11 is divided into an upstream piping 11a and a downstream piping 11b, and the photocatalyst addition section 20 is provided between the piping 11a and the piping 11b.

The photocatalyst addition section 20 corresponds to a member having a structure in which a photocatalyst can be mixed with the collected reactor primary system coolant 70 by supplying the collected reactor primary system coolant 70 to the photocatalyst supplied from a photocatalyst supply section 25 and by stirring the photocatalyst within the photocatalyst addition section 20.

Therefore, if the photocatalyst is supplied into the photocatalyst addition section 20, the collected reactor primary system coolant 70 containing the photocatalyst (the first mixed solution 71) is supplied from the piping 11b into the ultraviolet irradiation tank 13, and on the contrary, if the photocatalyst is not supplied into the photocatalyst addition section 20, the collected reactor primary system coolant 70 alone not containing the photocatalyst is supplied from the piping 11b into the ultraviolet irradiation tank 13.

The collected reactor primary system coolant 70 containing the photocatalyst (the first mixed solution 71) discharged from the photocatalyst addition section 20 through the piping 11b is fed to the ultraviolet irradiation tank 13.

A mixing ratio between the collected reactor primary system coolant 70 and the photocatalyst in the first mixed solution 71 is adjusted within the ultraviolet irradiation tank 13.

The ultraviolet irradiation tank 13 is configured so that the coolant such as the first mixed solution 71 held in the ultraviolet irradiation tank 13 can be irradiated with the ultraviolet rays 81 emitted from the ultraviolet irradiation section 30 provided outside the ultraviolet irradiation tank 13.

Since the ultraviolet rays are irradiated from the ultraviolet irradiation section 30 provided outside the ultraviolet irradiation tank 13, the ultraviolet irradiation tank 13 is at least partially made of a material transmitting the ultraviolet rays 81. Examples of the material transmitting the ultraviolet rays 81 include an ultraviolet transmitting glass and polycarbonate.

As the stirrer 14, any of known stirrers can be used.

<First Mixed Solution>

Figure 3:
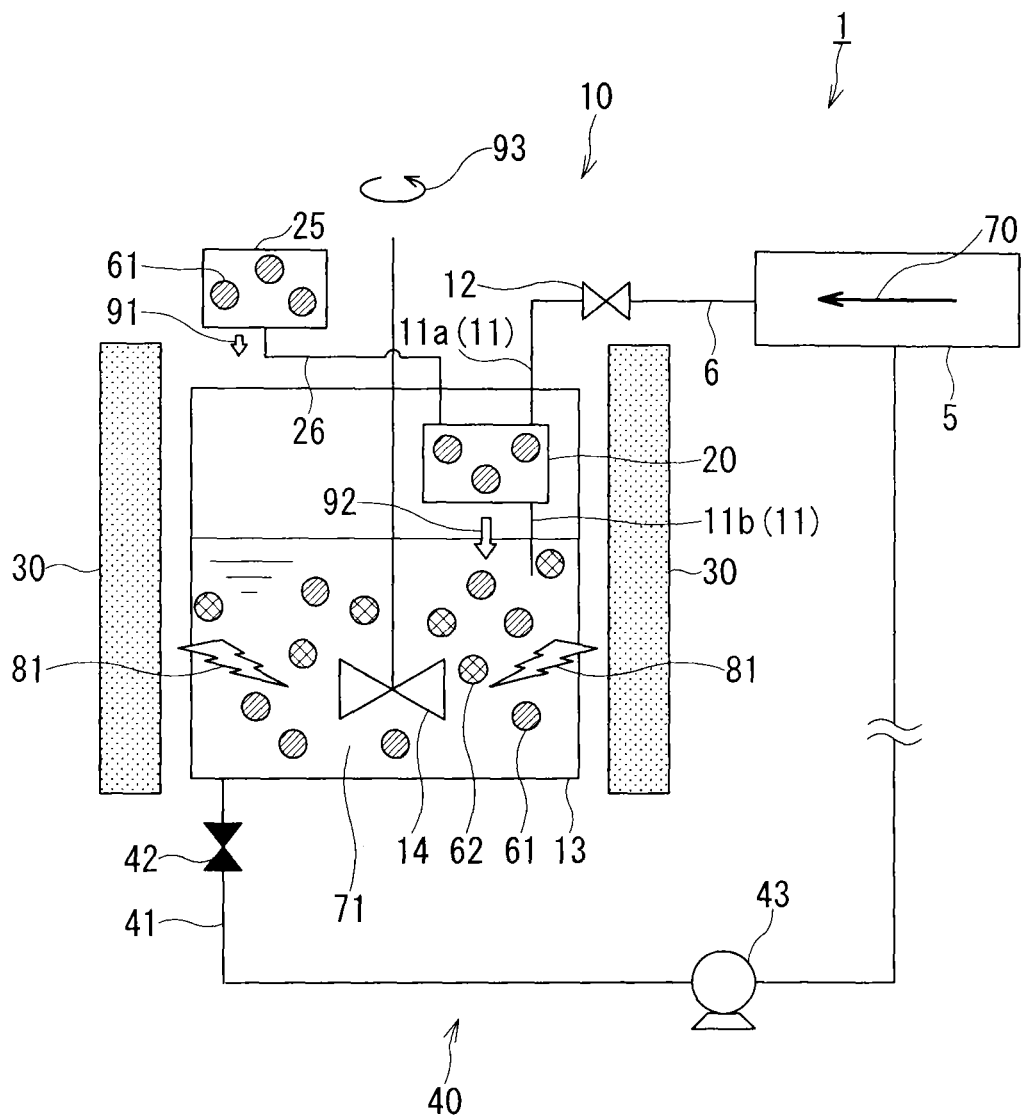
FIG. 3 is another schematic diagram explaining the configuration and the operation of the photocatalyst injection system of the present invention.

FIG. 3 is another schematic diagram explaining the configuration and the operation of the photocatalyst injection system of the present invention. FIG. 3 is a diagram illustrating a case where the coolant held in the ultraviolet irradiation tank 13 is the first mixed solution 71 containing a photocatalyst 61 in the photocatalyst injection system 1 of FIG. 1.

Here, the first mixed solution 71 means a liquid coolant containing the photocatalyst 61 and the noble metal or noble metal ion 62, which has been prepared by mixing the collected reactor primary system coolant 70 and the photocatalyst 61.

The noble metal or noble metal ion 62 contained in the first mixed solution 71 is the same as the noble metal or noble metal ion 62 contained in the reactor primary system coolant 70 and the collected reactor primary system coolant 70, and hence the description is herein omitted.

As illustrated in FIG. 3, the photocatalyst addition section 20 is a section in which the photocatalyst is added to the collected reactor primary system coolant 70 by mixing the collected reactor primary system coolant 70 having been fed through the reactor primary system coolant collection piping 11 with the photocatalyst 61 having been supplied from the photocatalyst supply section 25 through a photocatalyst supply piping 26 into the photocatalyst addition section 20.

The photocatalyst 61 supplied into the photocatalyst addition section 20 is stirred to be mixed in the photocatalyst addition section 20 by force of the flow of the collected reactor primary system coolant 70. The mixed solution of the collected reactor primary system coolant 70 and the photocatalyst 61 is supplied from the photocatalyst addition section 20 through the piping 11b into the ultraviolet irradiation tank 13. The mixing ratio of the supplied mixed solution is adjusted in the ultraviolet irradiation tank 13. Thus, the first mixed solution 71 containing the photocatalyst 61 and the noble metal or noble metal ion 62 is prepared within the ultraviolet irradiation tank 13.

Although an exemplified configuration using, in addition to the photocatalyst addition section 20, the photocatalyst supply piping 26 and the photocatalyst supply section 25, that is, equipment for supplying the photocatalyst to the photocatalyst addition section 20, is illustrated in FIG. 1, a configuration not using the photocatalyst supply piping 26 and the photocatalyst supply section 25 may be employed in the present invention. In this case, the photocatalyst 61 is supplied to the photocatalyst addition section 20 manually or the like.

Besides, instead of using the photocatalyst addition section 20 as the member for mixing the collected reactor primary system coolant 70 and the photocatalyst 61 within the photocatalyst addition section 20 as illustrated in FIG. 1, it may be used as a member for simply dropping the photocatalyst 61 into the ultraviolet irradiation tank 13 through a photocatalyst addition piping 27.

Figure 5:
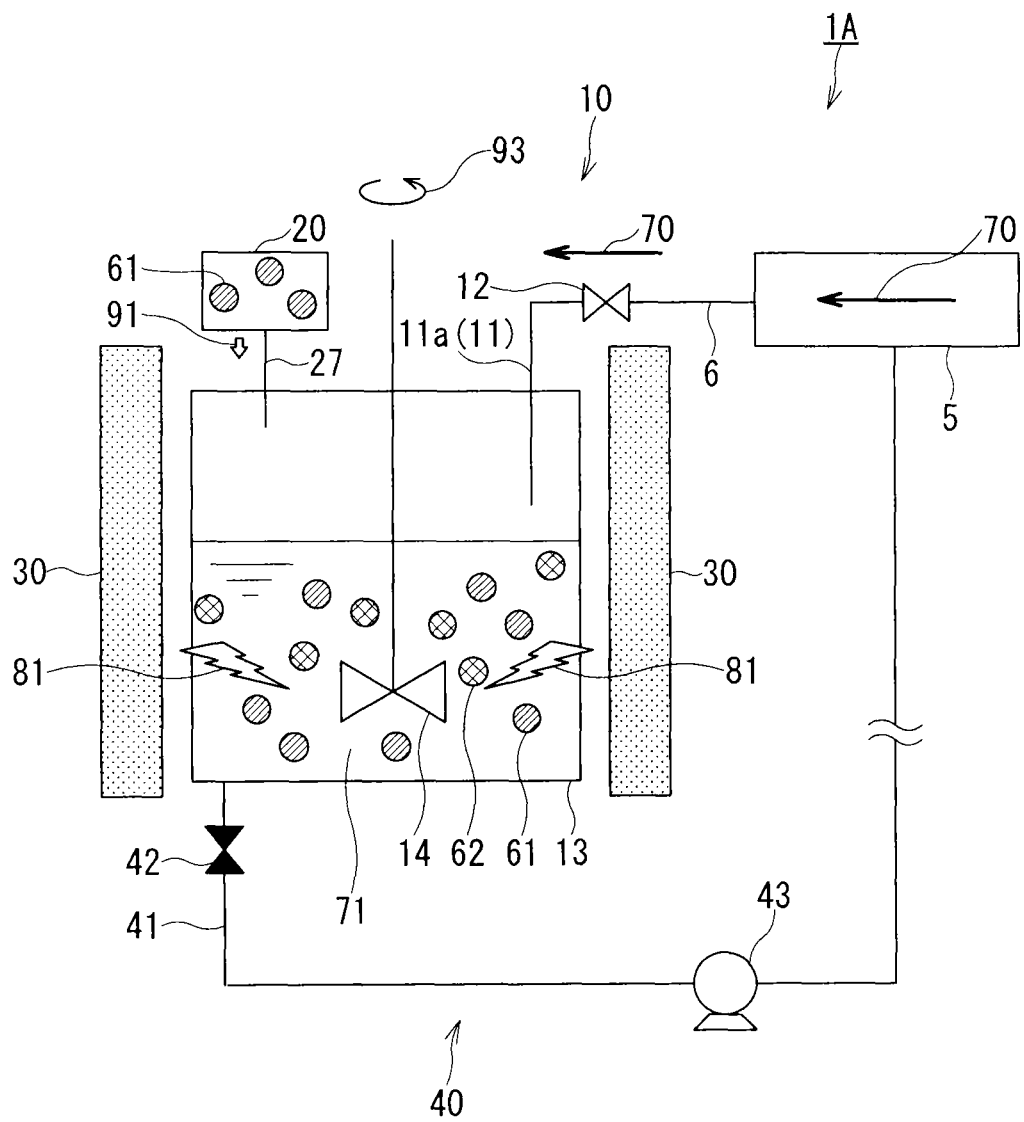
FIG. 5 is a schematic diagram of a modification of the photocatalyst injection system of the present invention.

In this case, the photocatalyst addition section 20 employs, for example, a configuration (of a photocatalyst injection system 1A) illustrated in FIG. 5. FIG. 5 is a schematic diagram of a modification of the photocatalyst injection system of the present invention.

If the photocatalyst addition section 20 employs this configuration, the photocatalyst 61 dropped into the coolant held in the ultraviolet irradiation tank 13 is subjected to stirring 93 by the stirrer 14 provided in the ultraviolet irradiation tank 13, and thus, the first mixed solution 71 containing the photocatalyst 61 and the noble metal or noble metal ion 62 is prepared in the ultraviolet irradiation tank 13.

[Photocatalyst]

The photocatalyst 61 used for preparing the first mixed solution 71 is an n-type semiconductor causing a photo-excitation reaction through irradiation with ultraviolet rays. Besides, the ultraviolet rays refer to electromagnetic waves of a wavelength of 10 to 400 nm. The ultraviolet rays are emitted from the ultraviolet irradiation section 30.

Examples of the n-type semiconductor used as the photocatalyst 61 include one or more compounds selected from titanium oxide $TiO_2$, iron oxide $Fe_2O_3$, zinc oxide ZnO, $ZrO_2$, PbO, $BaTiO_3$, $Bi_2O_3$, $WO_3$, $SrTiO_3$, $FeTiO_3$, $KTaO_3$, $MnTiO_3$ and $SnO_2$.

Among the above-described compounds, one or more compounds selected from titanium oxide $TiO_2$, iron oxide $Fe_2O_3$ and zinc oxide ZnO are preferably used as the n-type semiconductor corresponding to the photocatalyst 61 because the efficiency in a photocatalytic reaction is so high that the noble metal-carrying photocatalyst 65 can be efficiently produced in using such compounds.

In general, the photocatalyst 61 is a powder having an average particle size of 20 nm or less.

The first mixed solution 71 contains the photocatalyst 61 in a concentration of generally 10 to 200 mg/l, preferably 50 to 150 mg/l, and more preferably 80 to 120 mg/l.

Here, the concentration of the photocatalyst 61 means, if the photocatalyst 61 is consisting of a plurality of photocatalysts, a total value of the concentrations of all of the photocatalysts 61.

(Ultraviolet Irradiation Section)

Figure 4:
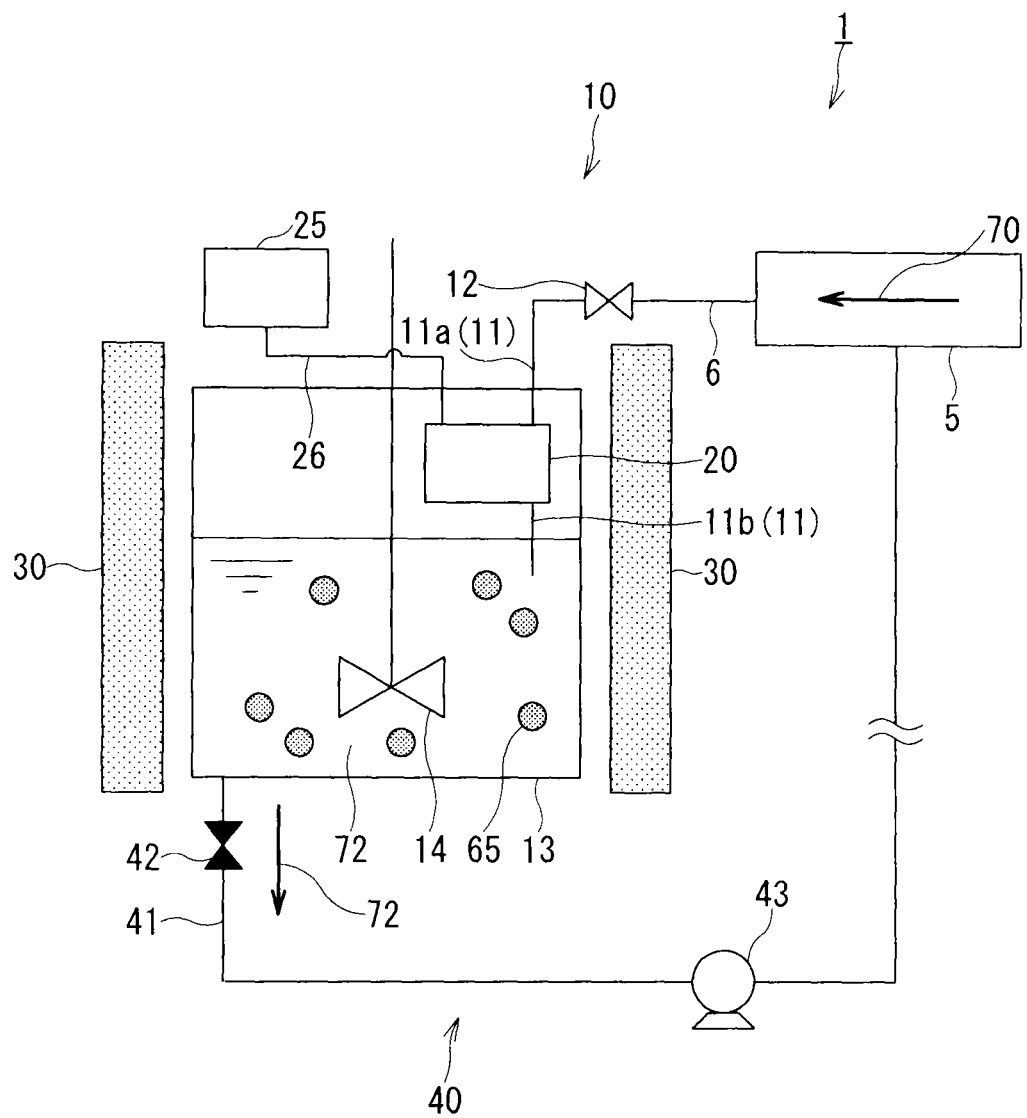
FIG. 4 is still another schematic diagram explaining the configuration and the operation of the photocatalyst injection system of the present invention.

FIG. 4 is another schematic diagram explaining the configuration and the operation of the photocatalyst injection system of the present invention. FIG. 4 is a diagram illustrating a case where the coolant held in the ultraviolet irradiation tank 13 is the second mixed solution 72 containing the noble metal-carrying photocatalyst 65 in the photocatalyst injection system 1 of FIG. 1.

As illustrated in FIGS. 3 and 4, the ultraviolet irradiation section 30 is a section in which the second mixed solution 72 containing the noble metal-carrying photocatalyst 65 is prepared by producing the noble metal-carrying photocatalyst 65, which contains a noble metal 63 carried on the surface of the photocatalyst 61 as illustrated in FIG. 6, in water by irradiating the first mixed solution 71 containing the photocatalyst 61 with the ultraviolet rays 81.

The ultraviolet irradiation section 30 is provided outside the ultraviolet irradiation tank 13, and emits the ultraviolet rays to the mixed solution held in the ultraviolet irradiation tank 13. As the ultraviolet irradiation section 30, any of known ultraviolet irradiation devices can be used.

Incidentally, in the photocatalyst injection system 1 illustrated in FIG. 1, an aspect is shown where the ultraviolet irradiation section 30 is provided outside the ultraviolet irradiation tank 13. In the photocatalyst injection system 1 of the present invention, however, the ultraviolet irradiation section 30 may be provided inside the ultraviolet irradiation tank 13. If the ultraviolet irradiation section 30 is provided inside the ultraviolet irradiation tank 13, the ultraviolet irradiation tank 13 may be made of a material not transmitting the ultraviolet rays 81. Examples of the material not transmitting the ultraviolet rays 81 include a stainless steel and a nickel base metal similarly to the material of the metal member constituting the reactor primary system 5.

<Second Mixed Solution>

The second mixed solution 72 means a liquid coolant containing the noble metal-carrying photocatalyst 65 produced by irradiating, with the ultraviolet rays 81, the first mixed solution 71 containing the photocatalyst 61 and the noble metal or noble metal ion 62.

Here, the noble metal-carrying photocatalyst 65 is obtained by changing the noble metal or noble metal ion 62 contained in the first mixed solution 71 into the noble metal 63 to be carried on the surface of the photocatalyst 61 as a result of the irradiation of the first mixed solution 71 with the ultraviolet rays 81.

The noble metal 63 is a metal of the same element as the noble metal or noble metal ion 62.

Examples of the noble metal 63 include one or more metals selected from Pt, Pd, Rh, Ru, Os and Ir.

Figure 6A:
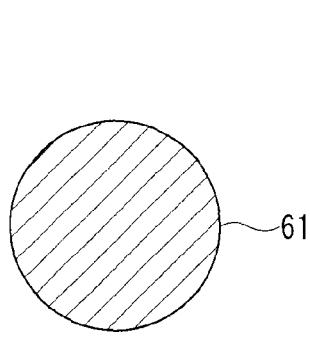
FIGS. 6A and 6B are schematic cross-sectional views of particles of a photocatalyst and a noble metal-carrying photocatalyst.
Figure 6B:
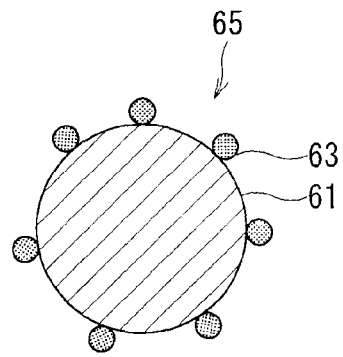

FIGS. 6A and 6B are schematic cross-sectional views of particles of the photocatalyst and the noble metal-carrying photocatalyst. Specifically, FIG. 6A is a schematic cross-sectional view of the particle of the photocatalyst 61, and FIG. 6B is a schematic cross-sectional view of the particle of the noble metal-carrying photocatalyst 65.

When the first mixed solution 71 containing the photocatalyst 61 and the noble metal ion 62 illustrated in FIG. 3 is irradiated with the ultraviolet rays 81, the noble metal ion ($M^{2+}$) 62 of FIG. 3 is reduced on the surface of the particle of the photocatalyst 61 of FIGS. 3 and 6A. The description will now be given on an exemplified case where the noble metal ion 62 is a bivalent cation ($M^{2+}$).

When the noble metal ion ($M^{2+}$) 62 is reduced, the noble metal (M) 63 is carried on the surface of the particle of the photocatalyst 61 as illustrated in FIG. 6B, so that the noble metal-carrying photocatalyst 65 having a cross-sectional structure as illustrated in FIG. 6B is produced in the coolant. Besides, if the first mixed solution 71 contains a noble metal 62 in the form of not an ion but a metal, this noble metal 62 is also carried on the surface of the particle of the photocatalyst 61 as the noble metal (M) 63.

The amount of the noble metal 63 carried on the noble metal-carrying photocatalyst 65 is generally 0.001% by mass to 10% by mass, preferably 0.01% by mass to 1% by mass, and more preferably 0.1% by mass to 1% by mass based on 100% by mass of the photocatalyst 61.

The temperature of the second mixed solution 72 held in the ultraviolet irradiation tank 13 is not especially limited.

(Noble Metal-Carrying Photocatalyst Injection Section)

The noble metal-carrying photocatalyst injection section 40 corresponds to a section for injecting the second mixed solution 72 into the reactor primary system 5.

The noble metal-carrying photocatalyst injection section 40 includes: a noble metal-carrying photocatalyst injection piping 41 for feeding the second mixed solution 72 held in the ultraviolet irradiation tank 13 to the reactor primary system 5; a valve 42 for controlling a flow rate of the second mixed solution 72 passing through the noble metal-carrying photocatalyst injection piping 41; and an injection pump 43 for injecting the second mixed solution 72 present in the noble metal-carrying photocatalyst injection piping 41 to the reactor primary system 5.

When the second mixed solution 72 is injected from the noble metal-carrying photocatalyst injection section 40 into the reactor primary system coolant 70 in contact with the metal member constituting the reactor primary system 5, the noble metal-carrying photocatalyst 65 contained in the second mixed solution 72 is injected into the reactor primary system coolant 70. The noble metal-carrying photocatalyst 65 injected into the reactor primary system coolant 70 deposits to the surface of the metal member constituting the reactor primary system 5. Then, if the noble metal-carrying photocatalyst 65 depositing to the surface of the metal member is irradiated with Cherenkov light or the like, the photocatalyst of the noble metal-carrying photocatalyst 65 causes a photo-excitation reaction due to light of the ultraviolet region contained in the Cherenkov light or the like, and hence, the corrosion potential of the metal member is lowered to increase the corrosion resistance of the metal member.

The description of the operation of the photocatalyst injection system 1 is the same as that of the photocatalyst injection method of the present invention described below. Since the photocatalyst injection method of the present invention will now be described, the description of the operation of the photocatalyst injection system 1 will be herein omitted.

[Photocatalyst Injection Method]

The photocatalyst injection method of the present invention includes: a reactor primary system coolant collecting step, a photocatalyst adding step, an ultraviolet irradiating step, and a noble metal-carrying photocatalyst injecting step.

The photocatalyst injection method of the present invention is practiced by using, for example, the photocatalyst injection system of FIG. 1.

(Reactor Primary System Coolant Collecting Step)

The reactor primary system coolant collecting step is a step in which the reactor primary system coolant 70 containing the noble metal or noble metal ion 62 is collected from the reactor primary system 5 through a coolant sampling piping 6 or the like.

The reactor primary system coolant collecting step is performed at the time of a normal operation, a shutdown, a startup or the like of the reactor. Incidentally, the photocatalyst adding step, the ultraviolet irradiating step and the noble metal-carrying photocatalyst injecting step described below are also performed at the time of a normal operation, a shutdown, a startup or the like of the reactor similarly to the reactor primary system coolant collecting step.

The reactor primary system coolant collecting step will be described with reference to FIG. 2.

In the reactor primary system coolant collecting step, the reactor primary system coolant 70 containing the noble metal or noble metal ion 62 is collected from the reactor primary system 5 as illustrated in FIG. 2. The collected reactor primary system coolant 70 is fed to the ultraviolet irradiation tank 13 through the reactor primary system coolant collection piping 11.

The collection of the reactor primary system coolant 70 is intermittently performed in general.

After the reactor primary system coolant collecting step, the reactor primary system coolant 70 containing the noble metal or noble metal ion 62 is held in the ultraviolet irradiation tank 13.

(Photocatalyst Adding Step)

The photocatalyst adding step is a step in which the collected reactor primary system coolant 70 is mixed with the photocatalyst 61. In the photocatalyst adding step, the first mixed solution 71 containing the photocatalyst 61 and the noble metal or noble metal ion 62 is prepared.

The photocatalyst adding step will be described with reference to FIG. 3.

As illustrated in FIG. 3, in the photocatalyst adding step, the collected reactor primary system coolant 70 fed through the reactor primary system coolant collection piping 11 is mixed, in the photocatalyst addition section 20, with the photocatalyst 61 supplied from the photocatalyst supply section 25 through the photocatalyst supply piping 26 in a direction of an arrow 91. The mixed solution (the first mixed solution 71) of the reactor primary system coolant 70 and the photocatalyst 61 is fed from the photocatalyst addition section 20 to the ultraviolet irradiation tank 13 through the piping 11b in a direction of an arrow 92. The first mixed solution 71 held in the ultraviolet irradiation tank 13 is prepared so that a mixing ratio between the reactor primary system coolant 70 and the photocatalyst 61 can be a prescribed ratio.

(Ultraviolet Irradiating Step)

The ultraviolet irradiating step is a step in which the noble metal-carrying photocatalyst 65 containing the noble metal 63 carried on the surface of the photocatalyst 61 is produced in the coolant by irradiating the coolant (the first mixed solution 71) obtained in the photocatalyst adding step with the ultraviolet rays. In the ultraviolet irradiating step, the second mixed solution 72 containing the noble metal-carrying photocatalyst 65 is prepared as illustrated in FIG. 4.

The ultraviolet irradiating step will be described with reference to FIGS. 3 and 4.

In the ultraviolet irradiating step, the first mixed solution 71 held in the ultraviolet irradiation tank 13 is irradiated with the ultraviolet rays 81 emitted from the ultraviolet irradiation section 30 as illustrated in FIG. 3.

The irradiation with the ultraviolet rays 81 is preferably performed with the ultraviolet irradiation intensity and the irradiation time controlled.

The irradiation intensity of the ultraviolet rays 81 is generally 0.01 $mW/cm^2$ or more and 20 $mW/cm^2$ or less, preferably 0.01 $mW/cm^2$ or more and 1 $mW/cm^2$ or less, and more preferably 0.01 $mW/cm^2$ or more and 0.1 $mW/cm^2$ or less. The ultraviolet rays 81 are preferably irradiated at a constant exposure dose.

If the irradiation intensity of the ultraviolet rays 81 exceeds 20 $mW/cm^2$, it is not economical because the rate of depositing the noble metal 63 on the photocatalyst 61 is not particularly improved as compared with the case where the irradiation intensity is less than 20 $mW/cm^2$.

The irradiation time of the ultraviolet rays 81 is varied depending upon the ultraviolet irradiation intensity. Specifically, if the irradiation intensity of the ultraviolet rays 81 is high, the irradiation time is set to be short, and if the irradiation intensity of the ultraviolet rays 81 is low, the irradiation time is set to be long.

During the irradiation with the ultraviolet rays 81, the stirring 93 of the first mixed solution 71 is preferably continued. If the first mixed solution 71 is continuously stirred during the irradiation with the ultraviolet rays 81, the noble metal-carrying photocatalyst 65 with a uniform composition can be easily produced.

The ultraviolet irradiating step is preferably performed by employing batch ultraviolet irradiation in which a prescribed amount of the first mixed solution 71 held in the ultraviolet irradiation tank 13 is irradiated with the ultraviolet rays 81 without adding the coolant such as the first mixed solution 71. If the batch ultraviolet irradiation is employed, the noble metal-carrying photocatalyst 65 can be definitely produced in the ultraviolet irradiation tank 13.

Through the ultraviolet irradiating step, the second mixed solution 72 containing the noble metal-carrying photocatalyst 65 is prepared from the first mixed solution 71.

The production of the second mixed solution 72 containing the noble metal-carrying photocatalyst 65 through the irradiation with the ultraviolet rays 81 of the first mixed solution 71 containing the photocatalyst 61 and the noble metal or noble metal ion 62 in the ultraviolet irradiating step will now be described with reference to the accompanying drawings.

Figure 7:
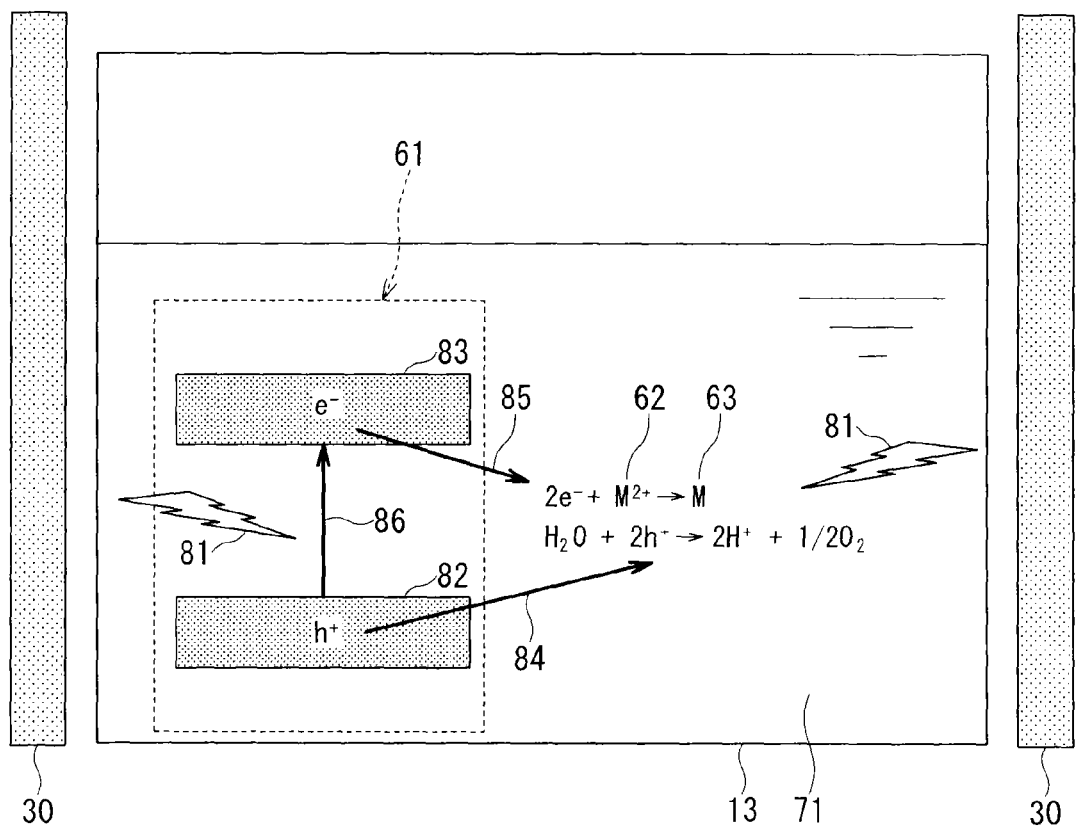
FIG. 7 is a diagram explaining the action of a photocatalyst and a noble metal ion in a coolant (water).

FIG. 7 is a diagram explaining the action of the photocatalyst and the noble metal ion in the coolant (water).

In FIG. 7, a reference numeral 82 schematically denotes a valence band of the photocatalyst 61, and a reference numeral 83 schematically denotes a conduction band of the photocatalyst 61. FIG. 7 explains the action of the photocatalyst 61 and the noble metal ion 62 occurring in the first mixed solution 71.

In FIG. 7, the level in the vertical direction in the drawing of each of the valence band 82 and the conduction band 83 corresponds to the height of electron energy. Specifically, FIG. 7 illustrates that the conduction band 83 disposed in a level higher than the valence band 82 has higher electron energy than the valence band 82.

The photocatalyst 61 contained in the first mixed solution 71 held in the ultraviolet irradiation tank 13 has low electron energy when it is not irradiated with the ultraviolet rays 81, and hence an electron is present in the valence band 82.

On the contrary, when the photocatalyst 61 held in the ultraviolet irradiation tank 13 is irradiated with the ultraviolet rays 81, a reaction is caused in the photocatalyst 61. Specifically, as illustrated in FIG. 7, a hole $h^+$ is generated in the valence band 82 of the photocatalyst 61, and the hole moves in a direction illustrated with a reference numeral 84, and at the same time, electron excitation 86 is caused, and the electron present in the valence band 82 moves to the conduction band 83 to cause electron movement in a direction illustrated with a reference numeral 85. This photoexcitation reaction in the photocatalyst 61 efficiently proceeds if the noble metal ion ($M^{2+}$) 62 is present in the vicinity of the photocatalyst 61.

On the other hand, in the coolant constituting the first mixed solution 71, a reaction represented by the following formula (1) is caused by the hole $h^+$ generated in the valence band 82 of the photocatalyst 61 to produce $H^+$:

[Formula 1]

$$H_2O + 2h^+ \rightarrow 2H^+ + 1/2 O_2 \quad (1)$$

Besides, the noble metal ion ($M^{2+}$) 62 contained in the first mixed solution 71 is reduced to produce the noble metal (M) through a reaction represented by the following formula (2) caused by an electron $e^-$ present in the conduction band 83 of the photocatalyst 61:

[Formula 2]

$$2e^- + M^{2+} \rightarrow M \quad (2)$$

The reaction of formula (2) generally occurs on the surface of the particle of the photocatalyst 61 present in the first mixed solution 71. Therefore, the noble metal (M) 63 deposits to the surface of the particle of the photocatalyst 61, and hence, the noble metal-carrying photocatalyst 65 as illustrated in FIG. 6B is produced in the coolant held in the ultraviolet irradiation tank 13.

Specifically, when the first mixed solution 71 held in the ultraviolet irradiation tank 13 is irradiated with the ultraviolet rays 81, the noble metal ion ($M^{2+}$) 62 illustrated in FIG. 3 is reduced on the surface of the particle of the photocatalyst 61 illustrated in FIGS. 3 and 6A. At this point, the noble metal (M) 63 is carried on the surface of the particle of the photocatalyst 61 as illustrated in FIG. 6B, and hence the noble metal-carrying photocatalyst 65 having a cross-sectional structure as illustrated in FIG. 6B is produced in the coolant. After the ultraviolet irradiating step, the coolant held in the ultraviolet irradiation tank 13 has been changed into the second mixed solution 72 containing the noble metal-carrying photocatalyst 65.

After preparing the second mixed solution 72 containing the noble metal-carrying photocatalyst 65, the stirring 93 by the stirrer 14 is appropriately halted. It is noted that the stirring by the stirrer 14 may be continuously performed.

Although the action of the noble metal ion ($M^{2+}$) 62 is described above, if the noble metal ion ($M^{2+}$) 62 is in the form of the noble metal (M) 63, the noble metal (M) 63 contained in the first mixed solution 71 deposits to the surface of the photocatalyst 61 as the noble metal (M) 63 during the ultraviolet irradiating step.

(Noble Metal-Carrying Photocatalyst Injecting Step)

The noble metal-carrying photocatalyst injecting step is a step in which the coolant (the second mixed solution 72) obtained in the ultraviolet irradiating step is injected into the reactor primary system 5.

The noble metal-carrying photocatalyst injecting step will be described with reference to FIG. 4.

As illustrated in FIG. 4, the second mixed solution 72 containing the noble metal-carrying photocatalyst 65 is held in the ultraviolet irradiation tank 13 after the ultraviolet irradiating step.

In the noble metal-carrying photocatalyst injecting step, the second mixed solution 72 held in the ultraviolet irradiation tank 13 is injected into the reactor primary system 5.

The second mixed solution 72 present in the noble metal-carrying photocatalyst injection piping 41 is injected into the reactor primary system 5 by using the injection pump 43.

The temperature of the second mixed solution 72 is not especially limited when it is held in the ultraviolet irradiation tank 13 as described above.

When the second mixed solution 72 is injected into the reactor primary system 5 through the noble metal-carrying photocatalyst injection section 40, however, a difference between the temperature of the second mixed solution 72 to be injected into the reactor primary system 5 and the temperature of the reactor primary system coolant 70 present in the reactor primary system 5 into which the second mixed solution 72 is to be injected is preferably smaller.

If the difference between the temperature of the second mixed solution 72 to be injected into the reactor primary system 5 and the temperature of the reactor primary system coolant 70 present in the reactor primary system 5 into which the second mixed solution 72 is to be injected is small, the rate of injecting the second mixed solution 72 can be advantageously easily controlled in injecting the second mixed solution 72 into the reactor primary system 5.

This is for the following reason.

The speed of the noble metal-carrying photocatalyst 65 contained in the second mixed solution 72 to deposit to the metal member of the reactor primary system 5 is exponentially increased as the temperature of the coolant containing the noble metal-carrying photocatalyst 65 is increased. Hereinafter, the speed of the noble metal-carrying photocatalyst 65 to deposit to the metal member of the reactor primary system 5 is designated as the "depositing speed of the noble metal-carrying photocatalyst 65".

Therefore, if either the temperature of the second mixed solution 72 to be injected into the reactor primary system 5 or the temperature of the reactor primary system coolant 70 present in the reactor primary system 5 is higher and a difference between these temperatures is large, the depositing speed of the noble metal-carrying photocatalyst 65 is largely changed before and after injecting the second mixed solution 72 due to this temperature difference. Accordingly, a distribution of the noble metal-carrying photocatalyst 65 depositing to the metal member of the reactor primary system 5 is easily varied.

For example, in the vicinity of an injection section of the second mixed solution 72 into the reactor primary system 5, the amount of the noble metal-carrying photocatalyst 65 depositing to the metal member tends to be large, and on the other hand, in a portion away from the injection section of the second mixed solution 72 into the reactor primary system 5, the amount of the noble metal-carrying photocatalyst 65 depositing to the metal member tends to be small.

Therefore, if either the temperature of the second mixed solution 72 to be injected into the reactor primary system 5 or the temperature of the reactor primary system coolant 70 present in the reactor primary system 5 is higher and the difference between these temperatures is large, in order to avoid the occurrence of the distribution variation of the noble metal-carrying photocatalyst 65 depositing to the metal member of the reactor primary system 5, the rate of injecting the second mixed solution 72 into the reactor primary system 5 is generally controlled to be small.

If either the temperature of the second mixed solution 72 to be injected into the reactor primary system 5 or the temperature of the reactor primary system coolant 70 present in the reactor primary system 5 is higher and the difference between these temperatures is large, however, since the depositing speed of the noble metal-carrying photocatalyst 65 is extremely high in a coolant of a high temperature, the change of the depositing speed of the noble metal-carrying photocatalyst 65 against the change of the injection rate is also extremely large. Therefore, delicate adjustment is required for adjusting the rate of injecting the second mixed solution 72 into the reactor primary system 5 to a desired injection rate.

Accordingly, in the present invention, the difference between the temperature of the second mixed solution 72 to be injected into the reactor primary system 5 and the temperature of the reactor primary system coolant 70 present in the reactor primary system 5 is reduced, so that the rate of injecting the second mixed solution 72 into the reactor primary system 5 can be easily adjusted and that the occurrence of the distribution variation of the noble metal-carrying photocatalyst 65 depositing to the metal member of the reactor primary system 5 can be suppressed.

Besides, in the present invention, the temperature of the second mixed solution 72 (that is, the coolant obtained by irradiating the first mixed solution 71 with the ultraviolet rays) at the time of the injection into the reactor primary system 5 is controlled to be 10° C. or more and 288° C. or less.

If the temperature of the second mixed solution 72 at the time of the injection into the reactor primary system 5 is 10° C. or more and 288° C. or less, the injection rate of the second mixed solution 72 into the reactor primary system 5 can be easily adjusted, and the occurrence of the distribution variation of the noble metal-carrying photocatalyst 65 depositing to the metal member of the reactor primary system 5 can be easily suppressed.

The second mixed solution 72 injected into the reactor primary system 5 is mixed with the reactor primary system coolant 70 already present in the reactor primary system 5. The noble metal-carrying photocatalyst 65 contained in a mixture of the reactor primary system coolant 70 and the second mixed solution 72 thus obtained (hereinafter referred to as the mixed coolant) comes into contact with the metal member constituting the reactor primary system 5 to deposit to the surface of the metal member.

Then, the photocatalyst of the noble metal-carrying photocatalyst 65 depositing to the surface of the metal member causes the photo-excitation reaction when irradiated with the ultraviolet rays, so as to lower the corrosion potential of the metal member, and thus, a high anticorrosion effect for the metal member is exhibited.

Here, examples of the ultraviolet rays used for irradiating the noble metal-carrying photocatalyst 65 depositing to the surface of the metal member include Cherenkov light generated in a reactor core and ultraviolet rays emitted from an ultraviolet irradiation device provided in the reactor primary system 5. Cherenkov light generated in the reactor core generally includes light of a wavelength of the ultraviolet region of approximately 390 nm. Therefore, through the irradiation with the ultraviolet rays included in Cherenkov light, the noble metal-carrying photocatalyst 65 can cause the photo-excitation reaction to lower the corrosion potential of the metal member, so as to exhibit the high anticorrosion effect for the metal member.

(Advantages of Photocatalyst Injection System and Photocatalyst Injection Method)

According to the photocatalyst injection system 1 of the present invention and the photocatalyst injection method practiced by mainly using the photocatalyst injection system 1, the noble metal-carrying photocatalyst 65 capable of largely lowering the corrosion potential of the metal member can be efficiently produced by using the reactor primary system coolant 70 collected from the reactor primary system 5.

Besides, according to the photocatalyst injection system 1 of the present invention and the photocatalyst injection method practiced by mainly using the photocatalyst injection system 1, the corrosion potential of the metal member constituting the reactor primary system 5 is largely lowered by injecting, into the reactor primary system 5, the second mixed solution 72 containing the noble metal-carrying photocatalyst 65 capable of largely lowering the corrosion potential of the metal member, and therefore, a high anti-corrosion effect for the metal member can be attained.

Furthermore, according to the photocatalyst injection system 1 of the present invention and the photocatalyst injection method practiced by mainly using the photocatalyst injection system 1, the noble metal or noble metal ion 62 contained in the reactor primary system coolant 70 of the reactor primary system 5 is used as the raw material of the noble metal 63 contained in the noble metal-carrying photocatalyst 65. Therefore, according to the photocatalyst injection system 1 of the present invention and the photocatalyst injection method practiced by mainly using the photocatalyst injection system 1, there is no need to newly supply a noble metal to the coolant of the nuclear power plant as the raw material of the noble metal 63 contained in the noble metal-carrying photocatalyst 65, and hence, the operating cost of the nuclear power plant can be reduced.

In this manner, according to the photocatalyst injection method and the photocatalyst injection system of the present invention, since the photo-excitation reaction is highly efficiently performed, the corrosion potential of the metal member is largely lowered, and hence, the anticorrosion effect is high and the operating cost is low.

Incidentally, although the boiling-water reactor (BWR) power plant has been described so far in the present embodiment, the present invention is also applicable to a reactor primary system of a pressurized water reactor (PWR) power plant. A reactor primary system of the pressurized water reactor power plant means a system, out of various systems

EXAMPLES

Examples of the present invention will now be described, but it is noted that the present invention is not limited to these examples.

Example 1

Production of Noble Metal-Carrying Photocatalyst

A testing apparatus having the same structure as the photocatalyst injection system 1 of FIG. 1 was prepared, and water of normal water quality of 280° C. meeting conditions of a normal water quality operation of a reactor and containing 10 ppm of a Pt ion was prepared as water simulating a reactor primary system coolant. Hereinafter, this water is designated as the reactor primary system coolant simulation water.

Next, the reactor primary system coolant simulation water was cooled to 20° C. to obtain water simulating a reactor primary system coolant.

To the reactor primary system coolant simulation water thus cooled to 20° C., a titanium oxide $TiO_2$ particle was added to prepare a first mixed solution of 20° C. containing 10 ppm of a Pt ion and 100 mg/l of the titanium oxide particle. Besides, as the ultraviolet irradiating step, the first mixed solution was irradiated with ultraviolet rays to prepare a second mixed solution containing a Pt-carrying titanium oxide particle in which Pt was carried on the surface of the titanium oxide $TiO_2$ particle.

Incidentally, in the ultraviolet irradiating step, the first mixed solution of 20° C. containing the Pt ion and the titanium oxide particle was irradiated with ultraviolet rays while stirring. The irradiation with the ultraviolet rays was performed with an irradiation intensity set to 1 $mW/cm^2$ and an irradiation time set to 1 hour.

In the thus obtained Pt-carrying titanium oxide particle, 0.1% by mass of Pt was carried based on 100% by mass of the titanium oxide particle.

Deposition of Noble Metal-Carrying Photocatalyst to Metal Member

A stainless steel test piece of stainless steel SUS 304 was prepared as a metal member, and the obtained Pt-carrying titanium oxide particle was allowed to deposit to the surface of the stainless steel test piece to prepare a Pt-carrying titanium oxide particle-depositing stainless steel test piece. The amount of the Pt-carrying titanium oxide particle depositing to the stainless steel test piece was 10 $\mu g/cm^2$.

(Measurement of Corrosion Potential)

The Pt-carrying titanium oxide particle-depositing stainless steel test piece was immersed in the reactor primary system coolant simulation water of 280° C., and while irradiating the Pt-carrying titanium oxide particle-depositing stainless steel test piece with ultraviolet rays at an intensity of 0.1 $mW/cm^2$, the corrosion potential of the Pt-carrying titanium oxide particle-depositing stainless steel test piece was measured.

Besides, while measuring the corrosion potential, hydrogen was gradually injected into the reactor primary system coolant simulation water, so as to measure the corrosion potential of the Pt-carrying titanium oxide particle-depositing stainless steel test piece in the reactor primary system coolant simulation water of hydrogen-injected water quality.

(Measurement Result of Corrosion Potential)

Figure 8:
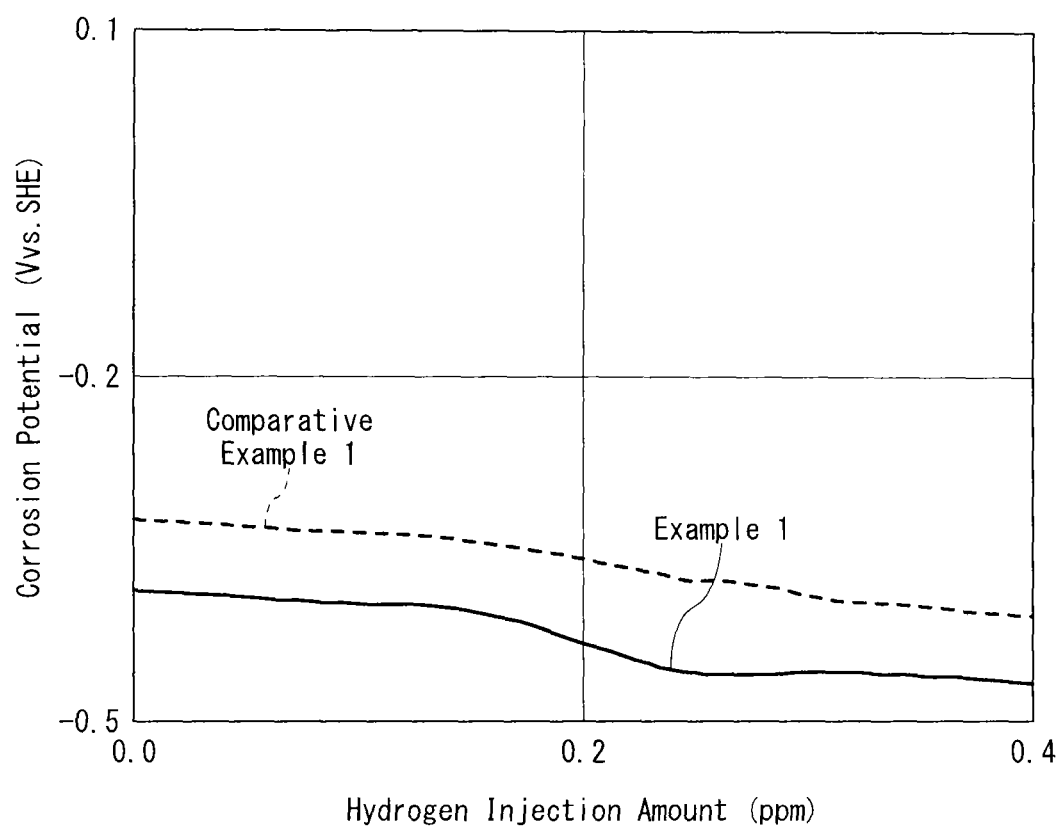
FIG. 8 is a graph illustrating the relationship between the amount of hydrogen injected into reactor primary system coolant simulation water in producing a Pt-carrying titanium oxide particle and a corrosion potential of a Pt-carrying titanium oxide particle-depositing stainless steel test piece.

FIG. 8 illustrates the relationship between the amount of hydrogen injected into the reactor primary system coolant simulation water in producing the Pt-carrying titanium oxide particle and the corrosion potential of the Pt-carrying titanium oxide particle-depositing stainless steel test piece.

It was understood from FIG. 8 that as the amount of hydrogen injected into the reactor primary system coolant simulation water is increased, the corrosion potential of the Pt-carrying titanium oxide particle-depositing stainless steel test piece is lowered to increase the corrosion resistance of the stainless steel in Example 1.

Comparative Example 1

Production of Noble Metal-Carrying Photocatalyst

A titanium oxide particle-depositing stainless steel test piece was prepared in the same manner as in Example 1 except that the Pt-carrying titanium oxide particle was replaced with a titanium oxide particle used as the raw material of the Pt-carrying titanium oxide particle of Example 1, and the corrosion potential was measured.

(Measurement Result of Corrosion Potential)

FIG. 8 illustrates the relationship between the amount of hydrogen injected into the reactor primary system coolant simulation water and the corrosion potential of the titanium oxide particle-depositing stainless steel test piece.

(Evaluation)

It was understood from FIG. 8 that as the amount of hydrogen injected into the reactor primary system coolant simulation water is increased, the corrosion potential of the titanium oxide particle-depositing stainless steel test piece is lowered to increase the corrosion resistance of the stainless steel in Comparative Example 1.

In addition, it was understood from FIG. 8 that the corrosion resistance of the stainless steel is higher in Example 1 than in Comparative Example 1 because the value of the corrosion potential is lower in Example 1 than in Comparative Example 1.

Examples 2 to 6

Production of Noble Metal-Carrying Photocatalyst

Pt-carrying titanium oxide particles (of Examples 2 to 6) were produced in the same manner as in Example 1 except that the irradiation intensity of the ultraviolet rays employed in the ultraviolet irradiating step was changed to 0.01 $mW/cm^2$ (in Example 2), 0.1 $mW/cm^2$ (in Example 3), 1 $mW/cm^2$ (in Example 4), 10 $mW/cm^2$ (in Example 5) and 100 $mW/cm^2$ (in Example 6), and that the irradiation time of the ultraviolet rays was set to 1 hour. It is noted that the Pt-carrying titanium oxide particle was produced in Example 3 under the same conditions as in Example 1.

(Measurement of Amount of Noble Metal Depositing to Surface of Photocatalyst in Noble Metal-Carrying Photocatalyst)

With respect to each of the Pt-carrying titanium oxide particles obtained as described above, a carried amount of Pt (the noble metal) on the titanium oxide particle (the photocatalyst) was examined. The carried amount of Pt was calculated as the amount (in % by mass) of carried Pt based on 100% by mass of the titanium oxide particle.

Figure 9:
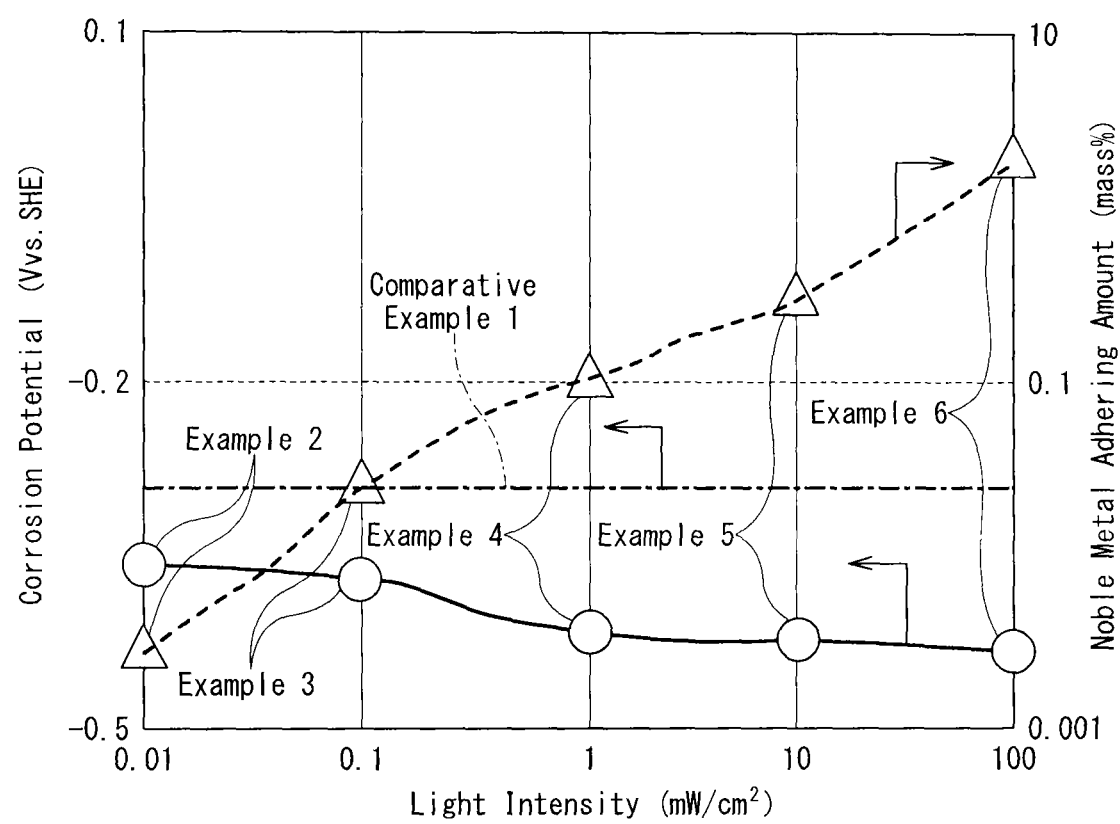
FIG. 9 is a graph illustrating the relationship between light intensity of ultraviolet irradiation employed in producing the Pt-carrying titanium oxide particle and the amount of Pt depositing to the surface of titanium oxide in the Pt-carrying titanium oxide particle, and the relationship between the light intensity of the ultraviolet irradiation employed in producing the Pt-carrying titanium oxide particle and a corrosion potential of the Pt-carrying titanium oxide particle-depositing stainless steel test piece.

FIG. 9 illustrates the relationship between the light intensity employed in the ultraviolet irradiation performed in producing each Pt-carrying titanium oxide particle and the amount of Pt depositing to the surface of the titanium oxide in the Pt-carrying titanium oxide particle.

(Deposition of Noble Metal-Carrying Photocatalyst to Metal Member)

Pt-carrying titanium oxide particle-depositing stainless steel test pieces (of Examples 2 to 6) were prepared in the same manner as in Example 1 except that the Pt-carrying titanium oxide particles obtained as described above were respectively used.

(Measurement of Corrosion Potential)

With respect to each of the Pt-carrying titanium oxide particle-depositing stainless steel test pieces obtained as described above, the corrosion potential was measured in the same manner as in Example 1 except that no hydrogen was injected into the reactor primary system coolant simulation water of the normal water quality of 280° C.

FIG. 9 illustrates the relationship between the light intensity of the ultraviolet irradiation employed in producing each Pt-carrying titanium oxide particle and the corrosion potential of the corresponding Pt-carrying titanium oxide particle-depositing stainless steel test piece. It is noted that the corrosion potential of the titanium oxide particle-depositing stainless steel test piece obtained in Comparative Example 1 is also illustrated in FIG. 9.

(Evaluation)

It was understood from FIG. 9 that as the light intensity of the ultraviolet irradiation employed in producing the Pt-carrying titanium oxide particle is increased, the amount of the Pt depositing to the surface of the titanium oxide in the Pt-carrying titanium oxide particle is increased.

Besides, it was understood from FIG. 9 that as the light intensity of the ultraviolet irradiation employed in producing the Pt-carrying titanium oxide particle is increased, the corrosion potential of the Pt-carrying titanium oxide particle-depositing stainless steel test piece is lowered to increase the corrosion resistance of the stainless steel.

In addition, it was understood from FIG. 9 that the corrosion potential is more largely lowered and the corrosion resistance of the stainless steel is higher in the Pt-carrying titanium oxide particle-depositing stainless steel test pieces of Examples 2 to 6 than in the titanium oxide particle-depositing stainless steel test piece of Comparative Example 1.

Examples 7 to 10 and Comparative Example 2

Production of Noble Metal-Carrying Photocatalyst

Pt-carrying titanium oxide particles (of Examples 7 to 10) were produced in the same manner as in Example 1 except that the irradiation intensity of the ultraviolet rays employed in the ultraviolet irradiating step was set to 1 mW/cm² and that the irradiation time of the ultraviolet rays was set to 5 minutes (in Example 7), 10 minutes (in Example 8), 15 minutes (in Example 9) and 20 minutes (in Example 10).

Besides, as a comparative example for Examples 7 to 10, a titanium oxide particle of Comparative Example 1, which corresponded to a noble metal-carrying photocatalyst obtained with the irradiation time of the ultraviolet rays employed in the ultraviolet irradiating step set to 0 minute, was prepared. This titanium oxide particle is defined as a titanium oxide particle of Comparative Example 2 for convenience.

(Measurement of Amount of Noble Metal Depositing to Surface of Photocatalyst in Noble Metal-Carrying Photocatalyst)

With respect to each of the Pt-carrying titanium oxide particles (of Examples 7 to 10) and the titanium oxide particle (of Comparative Example 2) obtained as described above, the carried amount of the Pt (the noble metal) on the titanium oxide particle (the photocatalyst) was examined in the same manner as in Example 2.

Figure 10:
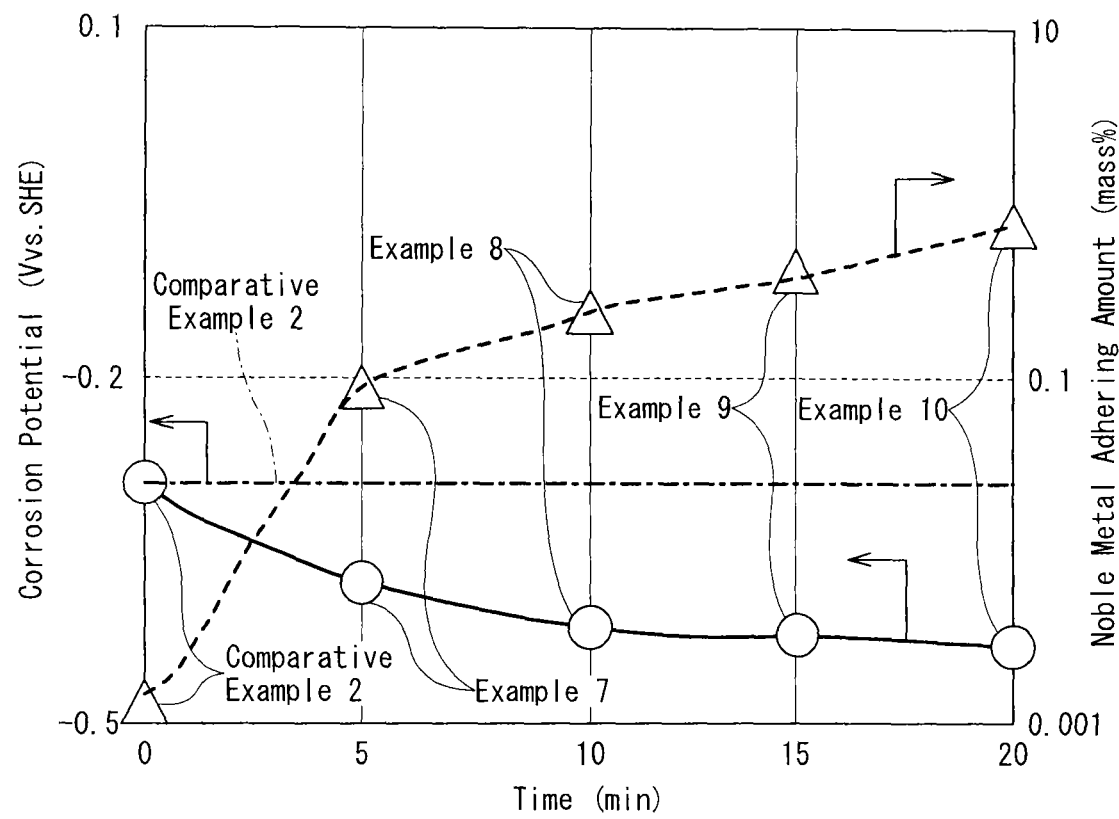
FIG. 10 is a graph illustrating the relationship between an irradiation time of the ultraviolet irradiation employed in producing the Pt-carrying titanium oxide particle and the amount of Pt depositing to the surface of the titanium oxide in the Pt-carrying titanium oxide particle, and the relationship between the irradiation time of the ultraviolet irradiation employed in producing the Pt-carrying titanium oxide particle and the corrosion potential of the Pt-carrying titanium oxide particle-depositing stainless steel test piece.

FIG. 10 illustrates the relationship between the irradiation time of the ultraviolet irradiation employed in producing the Pt-carrying titanium oxide particle and the amount of the Pt depositing to the surface of the titanium oxide in the Pt-carrying titanium oxide particle. Incidentally, although the amount of the Pt depositing to the titanium oxide particle obtained in Comparative Example 2 was actually 0 (zero), for convenience for illustration in FIG. 10, the amount of the depositing Pt of Comparative Example 2 was plotted as 0.001, that is, the minimum value of FIG. 10.

(Deposition of Noble Metal-Carrying Photocatalyst to Metal Member)

Pt-carrying titanium oxide particle-depositing stainless steel test pieces (of Examples 7 to 10) and a titanium oxide particle-depositing stainless steel test piece (of Comparative Example 2) were prepared in the same manner as in Example 1 except that the Pt-carrying titanium oxide particles (of Examples 7 to 10) and the titanium oxide particle (of Comparative Example 2) obtained as described above were respectively used.

(Measurement of Corrosion Potential)

With respect to each of the Pt-carrying titanium oxide particle-depositing stainless steel test pieces (of Examples 7 to 10) and the titanium oxide particle-depositing stainless steel test piece (of Comparative Example 2) obtained as described above, the corrosion potential was measured in the same manner as in Example 2.

FIG. 10 illustrates the relationship between the irradiation time of the ultraviolet irradiation employed in producing each Pt-carrying titanium oxide particle and the corrosion potential of the corresponding Pt-carrying titanium oxide particle-depositing stainless steel test piece.

(Evaluation)

It was understood from FIG. 10 that as the ultraviolet irradiation time employed in producing the Pt-carrying titanium oxide particle is increased, the amount of the Pt depositing to the surface of the titanium oxide in the Pt-carrying titanium oxide particle is increased.

Besides, it was understood from FIG. 10 that as the ultraviolet irradiation time employed in producing the Pt-carrying titanium oxide particle is increased, the corrosion potential of the Pt-carrying titanium oxide particle-depositing stainless steel test piece is lowered to increase the corrosion resistance of the stainless steel.

In addition, it was understood from FIG. 10 that the corrosion potential is more largely lowered and the corrosion resistance of the stainless steel is higher in the Pt-carrying titanium oxide particle-depositing stainless steel test pieces of Examples 7 to 10 than in the titanium oxide particle-depositing stainless steel test piece of Comparative Example 2.

Example 11

Production of Noble Metal-Carrying Photocatalyst

A Pt-carrying titanium oxide particle was produced in the same manner as in Example 5. In the thus obtained Pt-carrying titanium oxide particle (of Example 11-1), the carried amount of the Pt (the noble metal) on the titanium oxide particle (the photocatalyst) was examined in the same manner as in Example 2.

(Deposition of Noble Metal-Carrying Photocatalyst to Metal Member)

A Pt-carrying titanium oxide particle-depositing stainless steel test piece was prepared in the same manner as in Example 5.

(Durability of Noble Metal-Carrying Titanium Oxide for Carrying Noble Metal)

The Pt-carrying titanium oxide particle-depositing stainless steel test piece obtained as described above was immersed in the reactor primary system coolant simulation water of 280° C., and was subjected to the test for measuring the corrosion potential in the same manner as in Example 5 except that the Pt-carrying titanium oxide particle-depositing stainless steel test piece was continuously irradiated for 1 hour with ultraviolet rays at an intensity of 0.1 mW/cm$^2$. Incidentally, this test was performed for examining the durability of the Pt-carrying titanium oxide particle for carrying the noble metal, and hence the corrosion potential was not measured.

After completing the test for measuring the corrosion potential, a part of the Pt-carrying titanium oxide particle was collected from the Pt-carrying titanium oxide particle-depositing stainless steel test piece. The thus collected part of the Pt-carrying titanium oxide particle is herein defined as a Pt-carrying titanium oxide particle of Example 11-2. In the Pt-carrying titanium oxide particle of Example 11-2, the carried amount of the Pt (the noble metal) on the titanium oxide particle (the photocatalyst) was examined in the same manner as in Example 2.

Figure 11:
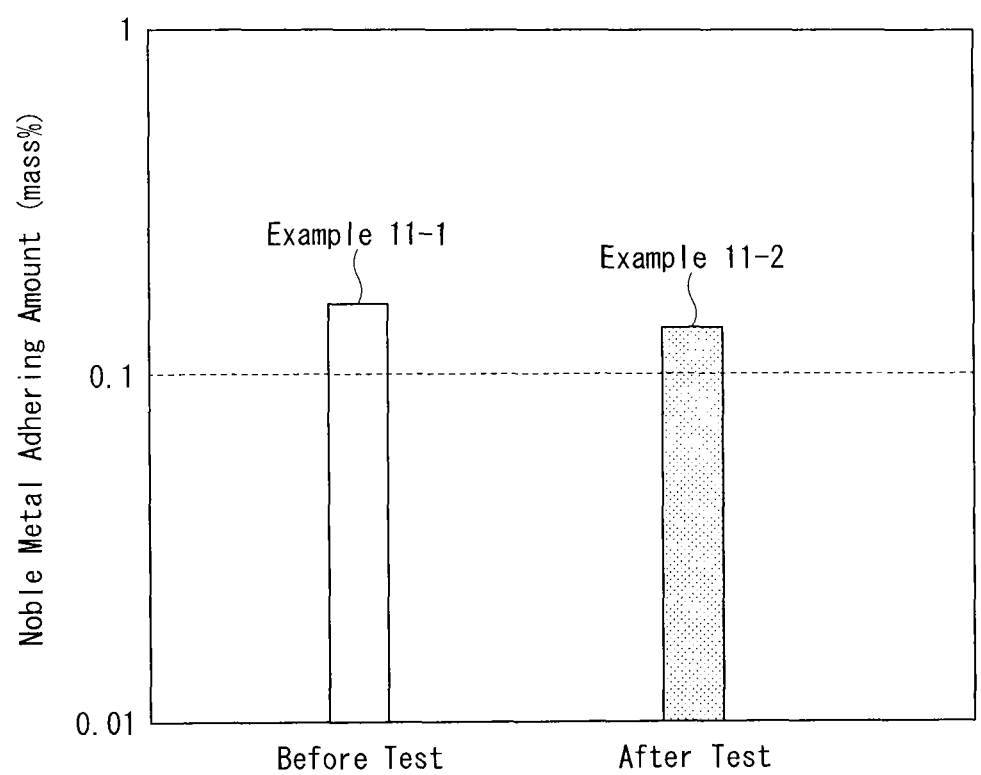
FIG. 11 is a graph illustrating the amounts of Pt depositing to the surface of the titanium oxide in the Pt-carrying titanium oxide particle measured before and after a test for measuring the corrosion potential.

FIG. 11 illustrates the amounts of Pt depositing to the surface of the titanium oxide in the Pt-carrying titanium oxide particles (of Examples 11-1 and 11-2) obtained before and after the test for measuring the corrosion potential.

(Evaluation)

It was understood from FIG. 11 that the Pt was little peeled off from the surface of the titanium oxide in the Pt-carrying titanium oxide particle depositing to the stainless steel test piece even through the exposure for 1 hour to the reactor primary system coolant simulation water of 280° C.

Examples 12 to 14

Production of Noble Metal-Carrying Photocatalyst

A Rh-carrying titanium oxide particle in which Rh was carried on the surface of a titanium oxide particle was produced in the same manner as in Example 1 except that reactor primary system coolant simulation water of normal water quality of 20° C., for simulating the conditions of a normal water quality operation of a reactor, containing 10 ppm of a Rh ion was used as the reactor primary system coolant simulation water (in Example 12).

A Ru-carrying titanium oxide particle in which Ru was carried on the surface of a titanium oxide particle was produced in the same manner as in Example 1 except that reactor primary system coolant simulation water of normal water quality of 20° C., for simulating the conditions of a normal water quality operation of a reactor, containing 10 ppm of a Ru ion was used as the reactor primary system coolant simulation water (in Example 13).

A Pd-carrying titanium oxide particle in which Pd was carried on the surface of a titanium oxide particle was produced in the same manner as in Example 1 except that reactor primary system coolant simulation water of normal water quality of 20° C., for simulating the conditions of a normal water quality operation of a reactor, containing 10 ppm of a Pd ion was used as the reactor primary system coolant simulation water (in Example 14).

(Deposition of Noble Metal-Carrying Photocatalyst to Metal Member)

A Rh-carrying titanium oxide particle-depositing stainless steel test piece (of Example 12) was prepared in the same manner as in Example 1 except that the Rh-carrying titanium oxide particle (of Example 12) obtained as described above was used. The amount of the Rh-carrying titanium oxide particle depositing to the stainless steel test piece was 10 μg/cm$^2$.

A Ru-carrying titanium oxide particle-depositing stainless steel test piece (of Example 13) was prepared in the same manner as in Example 1 except that the Ru-carrying titanium oxide particle (of Example 13) obtained as described above was used. The amount of the Ru-carrying titanium oxide particle depositing to the stainless steel test piece was 15 μg/cm$^2$.

A Pd-carrying titanium oxide particle-depositing stainless steel test piece (of Example 14) was prepared in the same manner as in Example 1 except that the Pd-carrying titanium oxide particle (of Example 14) obtained as described above was used. The amount of the Pd-carrying titanium oxide particle depositing to the stainless steel test piece was 10 μg/cm$^2$.

(Measurement of Corrosion Potential)

With respect to the Rh-carrying titanium oxide particle-depositing stainless steel test piece (of Example 12) obtained as described above, the corrosion potential was measured in the same manner as in Example 2 except that the corrosion potential was measured in reactor primary system coolant simulation water of normal water quality of 280° C. containing a Rh ion for simulating the conditions of a normal water quality operation of a reactor.

With respect to the Ru-carrying titanium oxide particle-depositing stainless steel test piece (of Example 13) obtained as described above, the corrosion potential was measured in the same manner as in Example 2 except that the corrosion potential was measured in reactor primary system coolant simulation water of normal water quality of 280° C. containing a Ru ion for simulating conditions of a normal water quality operation of a reactor.

With respect to the Pd-carrying titanium oxide particle-depositing stainless steel test piece (of Example 14) obtained as described above, the corrosion potential was measured in the same manner as in Example 2 except that the corrosion potential was measured in reactor primary system coolant simulation water of normal water quality of 280° C. containing a Pd ion for simulating the conditions of a normal water quality operation of a reactor.

Figure 12:
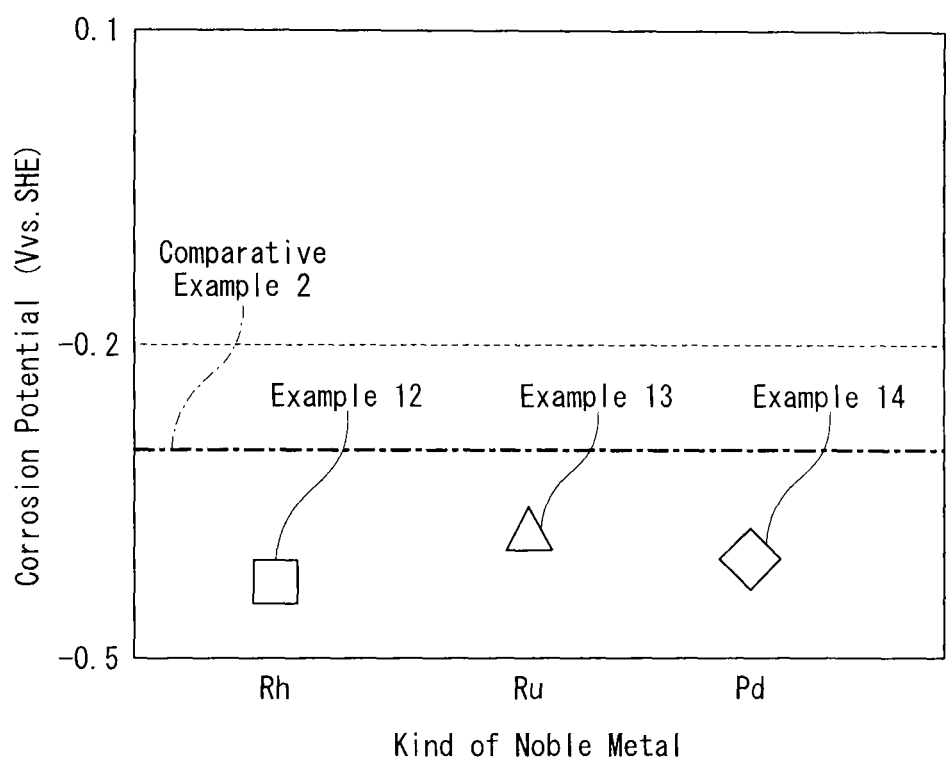
FIG. 12 is a graph illustrating the relationship between the kind of noble metal contained in a noble metal-carrying photocatalyst and a corrosion potential of a noble metal-carrying photocatalyst-depositing stainless steel test piece.

FIG. 12 illustrates the relationship between the kind of noble metal constituting each of the noble metal-carrying photocatalysts (of Examples 12 to 14) and the corrosion potential of the corresponding noble metal-carrying photocatalyst-depositing stainless steel test piece. Incidentally, the corrosion potential of the titanium oxide particle-depositing stainless steel test piece obtained in Comparative Example 2 is also illustrated in FIG. 12.

(Evaluation)

It was understood from FIG. 12 that the corrosion potential of the stainless steel was lowered and the corrosion resistance of the stainless steel was increased also in the Rh-carrying titanium oxide particle-depositing stainless steel test piece (of Example 12), the Ru-carrying titanium oxide particle-depositing stainless steel test piece (of Example 13) and the Pd-carrying titanium oxide particle-depositing stainless steel test piece (of Example 14) in the same manner as in the Pt-carrying titanium oxide particle-depositing stainless steel test piece.

Besides, each of the Rh-carrying titanium oxide particle-depositing stainless steel test piece (of Example 12), the Ru-carrying titanium oxide particle-depositing stainless steel test piece (of Example 13) and the Pd-carrying titanium oxide particle-depositing stainless steel test piece (of Example 14) was subjected to a test in which the irradiation intensity of the ultraviolet rays in the ultraviolet irradiating step was varied as in Examples 2 to 6 and a test in which the irradiation time of the ultraviolet rays in the ultraviolet irradiating step was varied as in Examples 7 to 10.

As a result, the Rh-carrying titanium oxide particle-depositing stainless steel test piece (of Example 12), the Ru-carrying titanium oxide particle-depositing stainless steel test piece (of Example 13) and the Pd-carrying titanium oxide particle-depositing stainless steel test piece (of Example 14) exhibited the same behavior as the Pt-carrying titanium oxide particle-depositing stainless steel test pieces of Examples 2 to 10.

Accordingly, it was found that the Rh-carrying titanium oxide particle, the Ru-carrying titanium oxide particle and the Pd-carrying titanium oxide particle can be used for the anticorrosion of stainless steel similarly to the Pt-carrying titanium oxide particle.

Examples 15 and 16

Production of Noble Metal-Carrying Photocatalyst

A Pt-carrying iron oxide particle (of Example 15) and a Pt-carrying zinc oxide particle (of Example 16) were produced in the same manner as in Example 1 except that the titanium oxide $TiO_2$ was replaced with iron oxide $Fe_2O_3$ (in Example 15) or zinc oxide $ZnO$ (in Example 16).

(Deposition of Noble Metal-Carrying Photocatalyst to Metal Member)

A Pt-carrying iron oxide particle-depositing stainless steel test piece (of Example 15) and a Pt-carrying zinc oxide particle-depositing stainless steel test piece (of Example 16) were prepared in the same manner as in Example 1 except that the Pt-carrying iron oxide particle (of Example 15) and the Pt-carrying zinc oxide particle (of Example 16) obtained as described above were respectively used.

(Measurement of Corrosion Potential)

With respect to the Pt-carrying iron oxide particle-depositing stainless steel test piece (of Example 15) and the Pt-carrying zinc oxide particle-depositing stainless steel test piece (of Example 16) obtained as described above, the corrosion potentials were measured in the same manner as in Example 2.

Figure 13:
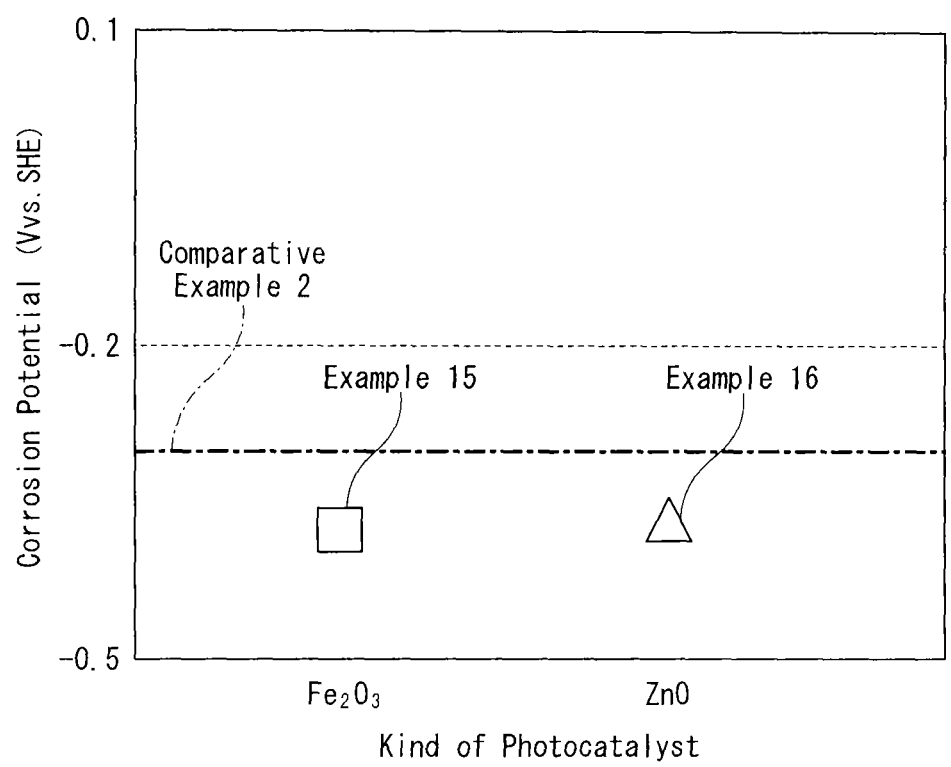
FIG. 13 is a graph illustrating the relationship between the kind of photocatalyst contained in a noble metal-carrying photocatalyst and a corrosion potential of a noble metal-carrying photocatalyst-depositing stainless steel test piece.

FIG. 13 illustrates the relationship between the kind of photocatalyst constituting the noble metal-carrying photocatalyst and the corrosion potential of the corresponding noble metal-carrying photocatalyst-depositing stainless steel test piece. Incidentally, the corrosion potential of the titanium oxide particle-depositing stainless steel test piece obtained in Comparative Example 2 is also illustrated in FIG. 13.

(Evaluation)

It was understood from FIG. 13 that the corrosion potential of the stainless steel is lowered and the corrosion resistance of the stainless steel is increased also in the Pt-carrying iron oxide particle-depositing stainless steel test piece (of Example 15) and the Pt-carrying zinc oxide particle-depositing stainless steel test piece (of Example 16) in the same manner as in the Pt-carrying titanium oxide particle-depositing stainless steel test piece.

The present invention has been described with reference to some embodiments thereof, which are merely descriptive and are not intended to restrict the scope of the present invention. Such novel embodiments can be practiced in other various forms, and various omissions, replacements or modifications can be made within the spirit of the present invention. These embodiments and modifications thereof are intended to be embraced within the scope and the spirit of the present invention and contained in the present invention indicated by the appended claims and equivalents thereof.

REFERENCE SIGNS LIST 1, 1A photocatalyst injection system
5 reactor primary system
6 coolant sampling piping
10 reactor primary system coolant collection section
11, 11a, 11b reactor primary system coolant collection piping
12 valve
13 ultraviolet irradiation tank
14 stirrer
20 photocatalyst addition section
25 photocatalyst supply section
26 photocatalyst supply piping
27 photocatalyst addition piping
30 ultraviolet irradiation section
40 noble metal-carrying photocatalyst injection section
41 noble metal-carrying photocatalyst injection piping
42 valve
43 injection pump
61 photocatalyst
62 noble metal ion
63 noble metal layer (noble metal)
65 noble metal-carrying photocatalyst
70 reactor primary system coolant (coolant)
71 first mixed solution (coolant)
72 second mixed solution (coolant)
80 ultraviolet rays
82 valence band (valence band of photocatalyst)
83 conduction band (conduction band of photocatalyst)
84 movement of hole
85 movement of electron
86 excitation
91, 92 movement of photocatalyst
93 stirring

The invention claimed is:
1. A photocatalyst injection method comprising:
a reactor primary system coolant collecting step of removing a reactor primary system coolant containing a noble metal or noble metal ion from a reactor primary system;
a photocatalyst adding step of adding a photocatalyst to the removed reactor primary system coolant;
an ultraviolet irradiating step of irradiating, outside of the reactor primary system, the coolant resulting from the photocatalyst adding step with ultraviolet rays and producing, in the irradiated coolant, a noble metal-carrying photocatalyst in which the noble metal is carried on a surface of the photocatalyst; and
a noble metal-carrying photocatalyst injecting step of injecting the coolant resulting from the ultraviolet irradiating step into the reactor primary system.

2. The photocatalyst injection method according to claim 1, wherein a temperature of the coolant resulting from the ultraviolet irradiating step at a time of injection into the reactor primary system is controlled to be 10° C. or more and 288° C. or less.

3. The photocatalyst injection method according to claim 1, wherein an amount of the noble metal carried on the noble metal-carrying photocatalyst is 0.001% by mass to 10% by mass based on 100% by mass of the photocatalyst.

4. The photocatalyst injection method according to claim 1, wherein an ultraviolet irradiation intensity employed in the ultraviolet irradiating step is 0.01 mW/cm' or more and 20 mW/cm$^2$ or less.

5. The photocatalyst injection method according to claim 1, wherein an ultraviolet irradiation intensity and an irradiation time are controlled in irradiation with the ultraviolet rays.

6. The photocatalyst injection method according to claim 1, wherein the noble metal is one or more selected from Pt, Pd, Rh, Ru, Os and Ir.

7. The photocatalyst injection method according to claim 1, wherein the photocatalyst is one or more selected from titanium oxide, iron oxide and zinc oxide.

8. The photocatalyst injection method according to claim 7, wherein the photocatalyst is $Fe_2O_3$.

9. A photocatalyst injection system for a nuclear reactor primary system comprising:
   means for removing a reactor primary system coolant containing a noble metal or noble metal ion from the reactor primary system the means for removing being fluidly coupled to the reactor primary system;
   means for adding a photocatalyst to the collected reactor primary system coolant;
   means for irradiating, with ultraviolet rays, the coolant to which the photocatalyst has been added for producing, in the coolant, a noble metal-carrying photocatalyst in which the noble metal is carried on a surface of the photocatalyst, the means for irradiating being arranged outside of the reactor primary system; and
   means for injecting the coolant containing the noble metal-carrying photocatalyst into the reactor primary system.

10. The photocatalyst injection system according to claim 9, wherein an inside of the means for adding holds the photocatalyst and the collected reactor primary system coolant and stirs the photocatalyst and the collected reactor primary system coolant together for mixing.

11. The photocatalyst injection system according to claim 9, wherein the means for adding drops the photocatalyst into the collected reactor primary system coolant.

12. The photocatalyst injection system according to claim 9, wherein the means for adding includes an ultraviolet irradiation tank and an ultraviolet irradiation source arranged outside of the ultraviolet irradiation tank.

13. A photocatalyst injection system for a nuclear reactor primary system comprising:
   an ultraviolet irradiation tank arranged outside of the reactor primary system;
   an outlet pipe configured to connect the reactor primary system to the ultraviolet irradiation tank and transfer a reactor primary system coolant from the reactor primary system to the ultraviolet irradiation tank, the reactor primary system coolant including a noble metal or noble metal ion;
   an inlet pipe configured to connect a photocatalyst source to the ultraviolet irradiation tank and add a photocatalyst from the photocatalyst source to the reactor primary system coolant in the ultraviolet irradiation tank to create a combined coolant;
   an ultraviolet irradiation source arranged outside of the reactor primary system and configured to irradiate, with ultraviolet rays, the combined coolant to produce, in the combined coolant, a noble metal-carrying photocatalyst in which the noble metal is carried on a surface of the photocatalyst; and
   an injection pipe configured to connect the ultraviolet irradiation tank to the reactor primary system and inject the combined coolant containing the noble metal-carrying photocatalyst into the reactor primary system.

14. The photocatalyst injection system according to claim 13, further comprising: a stirrer arranged inside of the ultraviolet irradiation tank and configured to mix together the photocatalyst and the collected reactor primary system coolant inside the ultraviolet irradiation tank.

15. The photocatalyst injection system according to claim 13, wherein the inlet pipe is configured to drop the photocatalyst into the collected reactor primary system coolant in the ultraviolet irradiation tank.

16. The photocatalyst injection system according to claim 13, wherein the ultraviolet irradiation source is arranged outside of the ultraviolet irradiation tank and configured to irradiate the irradiation tank.

* * * * *